US010644812B2

(12) United States Patent
Yoo et al.

(10) Patent No.: US 10,644,812 B2
(45) Date of Patent: May 5, 2020

(54) USER EQUIPMENT ANTENNA CALIBRATION WITH ASSISTANCE FROM OTHER DEVICES

(71) Applicant: QUALCOMM Incorporated, San Diego, CA (US)

(72) Inventors: Taesang Yoo, San Diego, CA (US); Xiaoxia Zhang, San Diego, CA (US); Tao Luo, San Diego, CA (US); Dinkar Vasudevan, Bangalore (IN); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/924,674

(22) Filed: Mar. 19, 2018

(65) Prior Publication Data

US 2018/0279311 A1    Sep. 27, 2018

Related U.S. Application Data

(60) Provisional application No. 62/474,917, filed on Mar. 22, 2017.

(51) Int. Cl.
*H04B 17/11* (2015.01)
*H04W 72/04* (2009.01)
(Continued)

(52) U.S. Cl.
CPC ............ *H04B 17/11* (2015.01); *H04B 17/21* (2015.01); *H04B 17/309* (2015.01);
(Continued)

(58) Field of Classification Search
CPC ...................................................... H04B 17/11
See application file for complete search history.

(56) References Cited

U.S. PATENT DOCUMENTS

2007/0206504 A1    9/2007  Koo et al.
2008/0125109 A1*   5/2008  Larsson ............ H04L 25/03343
                                                       455/424
(Continued)

FOREIGN PATENT DOCUMENTS

EP    1551143 A1    7/2005
EP    3110045 A1    12/2016

OTHER PUBLICATIONS

International Search Report and Written Opinion—PCT/US2018/023317—ISA/EPO—dated Jun. 27, 2018.

*Primary Examiner* — Jason E Mattis
(74) *Attorney, Agent, or Firm* — Haynes and Boone, LLP

(57) ABSTRACT

The present disclosure describes over-the-air UL-DL reciprocity calibration of UEs. In some embodiments, the UE may perform the calibration at the UE, while in other embodiments the BS may determine the calibration parameters for a UE and send the parameters to the UE for implementation. The BS may explicitly or implicitly transmit an UL channel estimate to the UE for use with the DL channel estimate. The UE determine calibration parameters to implement at the UE based on the BS feedback. Alternatively, the BS may transmit UE calibration parameters determined as a byproduct if the BS's own calibration procedure. The UE may instead participate in a calibration procedure with another UE. Under any approach, the UE may implement in its RF chain the results of the calibration procedure.

30 Claims, 18 Drawing Sheets

(51) Int. Cl.
*H04W 72/12* (2009.01)
*H04W 8/24* (2009.01)
*H04B 17/309* (2015.01)
*H04B 17/21* (2015.01)

(52) U.S. Cl.
CPC ....... *H04W 8/245* (2013.01); *H04W 72/0453* (2013.01); *H04W 72/12* (2013.01)

(56) References Cited

U.S. PATENT DOCUMENTS

| | | | | |
|---|---|---|---|---|
| 2012/0076017 A1* | 3/2012 | Luo | ....................... | H04L 1/0026 370/252 |
| 2012/0082248 A1* | 4/2012 | Han | ..................... | H04B 7/0413 375/259 |
| 2012/0243424 A1* | 9/2012 | Wang | ..................... | H04B 7/024 370/252 |
| 2014/0098902 A1* | 4/2014 | Harel | ..................... | H04B 7/086 375/267 |
| 2016/0308624 A1* | 10/2016 | Rong | ..................... | H04B 7/024 |

\* cited by examiner

USER EQUIPMENT ANTENNA CALIBRATION WITH ASSISTANCE FROM OTHER DEVICES

The present application claims priority to and the benefit of the U.S. Provisional Patent Application No. 62/474,917, filed Mar. 22, 2017, which is hereby incorporated by reference in its entirety as if fully set forth below in its entirety and for all applicable purposes.

TECHNICAL FIELD

This application relates to wireless communication systems, and more particularly to user equipment (UE) antenna calibration using an inter-evolved Node B (eNB) or using other UEs for performing over-the-air calibration to account for gain and/or phase imbalances between uplink (UL) channels and downlink (DL) channels.

INTRODUCTION

A wireless communication network may include a number of base stations (BSs) that can support communication for a number of UEs. In Long Term Evolution (LTE), BSs are referred to as evolved NodeBs (eNBs). In recent years, the carrier frequencies at which BSs and UEs communicate have continued to increase and include larger bandwidths. To take advantage of these higher frequencies, more antennas in the same physical space have been used. For these higher frequency bands to be useful and approximate the same coverage radius as prior technologies (such as 2G, 3G, or 4G), however, more beam forming gain (and more accuracy) is becoming necessary.

Conventional systems employ various types of reference signals, with varying fixed structures, to provide sufficient measurements and estimations for adaptive multi-antenna operation in uplink (UL) and/or downlink (DL) directions. For example, a channel state information reference signal (CSIRS) may be used on a DL from the BS to aid the BS in beam form determination, an UL demodulation reference signal (DMRS) specific to each UE may be used to estimate channel information for the UL specifically, and each UE may use a sounding reference signal (SRS) on the UL to aid in scheduling (e.g., determining which frequency bands are good or bad for data).

Reciprocity describes the ability for a station to use information (such as a multipath delay profile) from one channel (e.g., the UL) in making determinations regarding another channel (e.g., the DL). In time-division duplexing (TDD) systems, the physical UL channel and the physical DL channel are identical since UL and DL operate in the same frequency band. For example, BSs may compute UL channel estimates based on SRSs transmitted by UEs and use the UL channel estimates for DL beamforming. However, in practice, a communication channel between a pair of nodes (e.g., a BS and a UE) includes not only the physical channel, but also radio frequency (RF) transceiver chains, for example, including power amplifiers (PAs), low noise amplifiers (LNAs), antennas, low-noise amplifiers (LNAs), RF mixers, filters, analog-to-digital (A/D) converters, and in-phase quadrature-phase (I/Q) imbalances, which may be different between different nodes and/or different antennas. Thus, each antenna chain can introduce a mismatch, for example, in amplitude and/or phase, to transmitted and/or received signals. The mismatch may impact performance of channel reciprocity-based transmissions at both the BS and UE sides.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes transmitting, by a user equipment (UE), an uplink (UL) calibration reference signal (RS) and a calibration request to a base station. The method includes receiving, by the UE from the base station in response to the calibration request, a downlink (DL) calibration RS and an UL channel estimate of an UL channel associated with the UE and the base station. The method also includes calibrating, by the UE, one or more parameters of the UE based on the UL channel estimate and a DL channel estimate, of a DL channel associated with the UE and the base station, based on the DL calibration RS.

In an additional aspect of the disclosure, a method of wireless communication includes receiving, by a base station, an UL calibration RS and a calibration request from a UE. The method also includes determining, by the base station, an UL channel estimate of an UL channel associated with the UE and the base station based on the UL calibration RS. The method further includes transmitting, by the base station to the UE in response to the calibration request, a DL calibration RS and the UL channel estimate for use by the UE in calibrating one or more parameters of the UE.

In an additional aspect of the disclosure, a method of wireless communication includes transmitting, by a base station, a DL calibration RS and a calibration request to a UE. The method also includes receiving, by the base station from the UE in response to the calibration request, an UL calibration RS and a DL channel estimate of a DL channel associated with the base station and the UE based on the DL calibration RS. The method further includes determining, by the base station based on the DL channel estimate and an UL channel estimate, a first one or more calibration parameters for the base station and a second one or more calibration parameters for the UE. The method also includes transmitting, from the base station to the UE, the second one or more calibration parameters for calibration of the UE.

In an additional aspect of the disclosure, a method of wireless communication includes receiving, by a UE from a base station, a DL calibration RS and a calibration request. The method also includes determining, by the UE, a DL channel estimate of a DL channel associated with the base station and the UE based on the DL calibration RS. The method further includes transmitting, by the UE to the base station in response to the calibration request, an UL calibration RS and the DL channel estimate for use by the base station to determine one or more calibration parameters for the UE. The method also includes receiving, by the UE from the base station, the one or more calibration parameters for calibration at the UE.

In an additional aspect of the disclosure, a method of wireless communication includes transmitting, by a first UE, a first sidelink (SL) calibration RS and a calibration request to a second UE. The method also includes receiving, by the first UE from the second UE in response to the calibration request, a second SL calibration RS and a first SL channel estimate of a first SL channel from the first UE to the second UE based on the first SL calibration RS. The method further includes determining, by the first UE, one or more calibration parameters of the first UE based on the first SL channel estimate and a second SL channel estimate of a second SL channel from the second UE to the first UE.

In an additional aspect of the disclosure, an apparatus is provided that includes a transmitter that may transmit an UL calibration RS and a calibration request to a base station. The apparatus further includes a receiver that may receive, from the base station in response to the calibration request, a DL calibration RS and an UL channel estimate of an UL channel associated with the apparatus and the base station based on the UL calibration RS. The apparatus also includes a processor that may calibrate, one or more parameters of the apparatus based on the UL channel estimate and a DL channel estimate.

In an additional aspect of the disclosure, an apparatus is provided that includes a receiver that may receive an UL calibration RS and a calibration request from a UE. The apparatus further includes a processor that may determine an UL channel estimate of an UL channel associated with the UE and the apparatus based on the UL calibration RS. The apparatus also includes a transmitter that may transmit to the UE in response to the calibration request, a DL calibration RS and the UL channel estimate for use by the UE in calibrating one or more parameters of the UE.

In an additional aspect of the disclosure, an apparatus is provided that includes a transmitter that may transmit a DL calibration RS and a calibration request to a user equipment (UE). The apparatus also includes a receiver that may receive, from the UE in response to the calibration request, an uplink (UL) calibration RS and a DL channel estimate of a DL channel associated with the apparatus and the UE based on the DL calibration RS. The apparatus further includes a processor that may determine, based on the DL channel estimate and an UL channel estimate, a first one or more calibration parameters for the apparatus and a second one or more calibration parameters for the UE. The transmitter may further transmit, to the UE, the second one or more calibration parameters for calibration of the UE.

In an additional aspect of the disclosure, an apparatus is provided that includes a receiver that may receive, from a base station, a DL calibration RS and a calibration request. The apparatus further includes a processor that may determine a DL channel estimate of a DL channel associated with the base station and the apparatus based on the DL calibration RS. The apparatus also includes a transmitter that may transmit, to the base station in response to the calibration request, an UL calibration RS and the DL channel estimate for use by the base station to determine one or more calibration parameters for the apparatus. The receiver may receive, from the base station, the one or more calibration parameters for calibration at the apparatus.

In an additional aspect of the disclosure, an apparatus is provided that includes a transmitter that may transmit a first sidelink (SL) calibration RS and a calibration request to a UE. The apparatus further includes a receiver that may receive from the UE in response to the calibration request, a second SL calibration RS and a first SL channel estimate of a first SL channel from the apparatus to the UE based on the first SL calibration RS. The apparatus also includes a processor that may determine one or more calibration parameters of the apparatus based on the first SL channel estimate and a second SL channel estimate of a second SL channel from the UE to the apparatus.

In an additional aspect of the disclosure, a computer-readable medium has program code recorded thereon. The program code includes code for causing a UE to transmit an UL calibration RS and a calibration request to a base station. The program code includes code for causing the UE to receive, from the base station in response to the calibration request, a DL calibration RS and an UL channel estimate of an UL channel associated with the UE and the base station based on the UL calibration RS. The program code also includes code for causing the UE to calibrate one or more parameters of the UE based on the UL channel estimate and a DL channel estimate based on the DL calibration RS.

In an additional aspect of the disclosure, a computer-readable medium has program code recorded thereon. The program code includes code for causing a base station to receive an UL calibration RS and a calibration request from a UE. The program code includes code for causing the base station to determine an UL channel estimate of an UL channel associated with the UE and the base station based on the UL calibration RS. The program code also includes code for causing the base station to transmit, to the UE in response to the calibration request, a DL calibration RS and the UL channel estimate for use by the UE in calibrating one or more parameters of the UE.

In an additional aspect of the disclosure, a computer-readable medium has program code recorded thereon. The program code includes code for causing a base station to transmit a DL calibration RS and a calibration request to a UE. The program code includes code for causing the base station to receive, from the UE in response to the calibration request, an UL calibration RS and a DL channel estimate of a DL channel associated with the base station and the UE based on the DL calibration RS. The program code also includes code for causing the base station to determine, based on the DL channel estimate and an UL channel estimate, a first one or more calibration parameters for the base station and a second one or more calibration parameters for the UE. The program code further includes code for causing the base station to transmit, to the UE, the second one or more calibration parameters for calibration of the UE.

In an additional aspect of the disclosure, a computer-readable medium has program code recorded thereon. The program code includes code for causing a UE to receive, from a base station, a DL calibration RS and a calibration request. The program code includes code for causing the UE to determine a DL channel estimate of a DL channel associated with the base station and the UE based on the DL calibration RS. The program code also includes code for causing the UE to transmit, to the base station in response to the calibration request, an UL calibration RS and the DL channel estimate for use by the base station to determine one or more calibration parameters for the UE. The program code further includes code for causing the UE to receive, from the base station, the one or more calibration parameters for calibration at the UE.

In an additional aspect of the disclosure, a computer-readable medium has program code recorded thereon. The program code includes code for causing a first UE to transmit a SL calibration RS and a calibration request to a second UE. The program code includes code for causing the first UE to receive, from the second UE in response to the calibration request, a second SL calibration RS and a first SL channel estimate of a first SL channel from the first UE to the second UE based on the SL calibration RS. The program code also includes code for causing the first UE to determine one or more calibration parameters of the first UE based on the first SL channel estimate and a second SL channel estimate of a second SL channel from the second UE to the first UE.

In an additional aspect of the disclosure, an apparatus is provided that includes means for transmitting an UL calibration RS and a calibration request to a base station. The apparatus includes means for receiving, from the base station in response to the calibration request, a DL calibration RS and an UL channel estimate of an UL channel associated with the apparatus and the base station based on the UL calibration RS. The apparatus also includes means for calibrating one or more parameters of the apparatus based on the UL channel estimate and a DL channel estimate based on the DL calibration RS.

In an additional aspect of the disclosure, an apparatus is provided that includes means for receiving an UL calibration RS and a calibration request from a UE. The apparatus includes means for determining an UL channel estimate of an UL channel associated with the UE and the apparatus based on the UL calibration RS. The apparatus further includes means for transmitting, to the UE in response to the calibration request, a DL calibration RS and the UL channel estimate for use by the apparatus in calibrating one or more parameters of the UE.

In an additional aspect of the disclosure, an apparatus is provided that includes means for transmitting a DL calibration RS and a calibration request to a UE. The apparatus includes means for receiving, from the UE in response to the calibration request, an UL calibration RS and a DL channel estimate of a DL channel associated with the apparatus and the UE based on the DL calibration RS. The apparatus also includes means for determining, based on the DL channel estimate and an UL channel estimate, a first one or more calibration parameters for the apparatus and a second one or more calibration parameters for the UE. The apparatus further includes means for transmitting, to the UE, the second one or more calibration parameters for calibration of the UE.

In an additional aspect of the disclosure, an apparatus is provided that includes means for receiving, from a base station, a DL calibration RS and a calibration request. The apparatus includes means for determining a DL channel estimate of a DL channel associated with the base station and the apparatus based on the DL calibration RS. The apparatus also includes means for transmitting, to the base station in response to the calibration request, an UL calibration RS and the DL channel estimate for use by the base station to determine one or more calibration parameters for the apparatus. The apparatus further includes means for receiving, from the base station, the one or more calibration parameters for calibration at the apparatus.

In an additional aspect of the disclosure, an apparatus is provided that includes means for transmitting a first SL calibration RS and a calibration request to a UE. The apparatus includes means for receiving, from the UE in response to the calibration request, a second SL calibration RS and a first SL channel estimate of a first SL channel from the apparatus to the UE based on the first SL calibration RS. The apparatus further includes means for determining one or more calibration parameters of the apparatus based on the first SL channel estimate and a second SL channel estimate of a second SL channel from the UE to the apparatus.

Other aspects, features, and embodiments of the present disclosure will become apparent to those of ordinary skill in the art, upon reviewing the following description of specific, exemplary embodiments of the present disclosure in conjunction with the accompanying figures. While features of the present invention may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
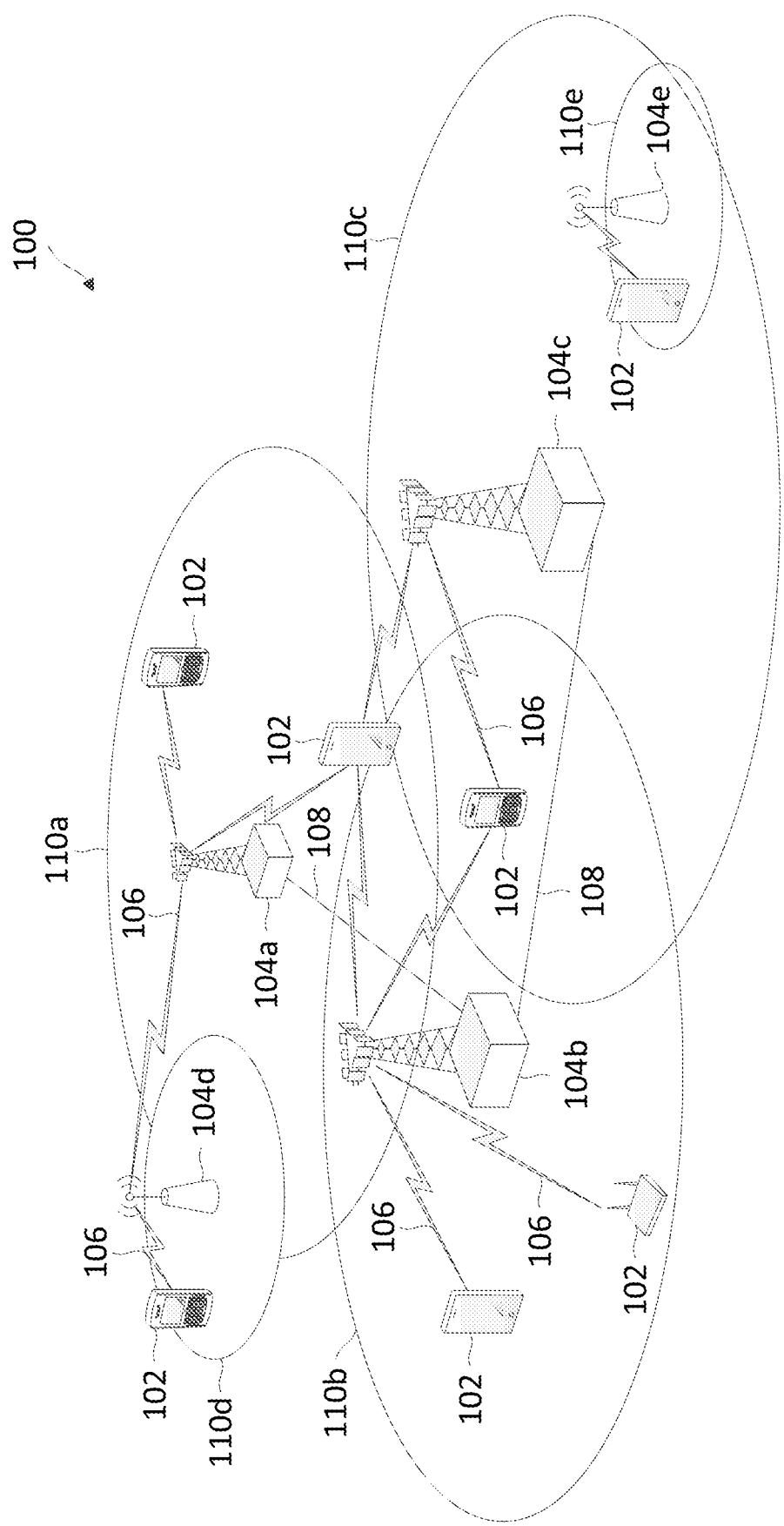
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

The present disclosure describes over-the-air UL-DL reciprocity calibration of UEs. For over-the-air UL-DL calibration of the UE, a BS or another UE may be used. The calibration can be performed and calibration parameters, e.g., coefficients, can be calculated and can be used by the UE. In some embodiments, the UE may perform the calibration at the UE, while in other embodiments the BS may determine the calibration parameters for a UE and send the parameters to the UE for implementation.

For example, in other embodiments, to perform the calibration, the BS may transmit a DL calibration reference signal (RS) to the UE and request the UE to transmit an UL calibration RS. In response, the UE may determine, e.g., compute, DL channel estimates based on the DL calibration RS and transmit the DL channel estimates and UL calibration RS to the BS. The BS may determine, e.g., compute, UL channel estimates based on the UL calibration RS. The BS may perform the calibration by determining calibration parameters (e.g., coefficients) for adjusting UL channel estimates such that a difference between the DL channel estimates and the UL channel estimates as adjusted by the calibration parameters (e.g., coefficients) is minimized. The BS may then provision the calibration parameters to the UE. During normal operation, the UE may apply the calibration parameters to DL channel estimates computed from RSs transmitted by the BS for the purpose of deriving uplink channel estimates.

As another example, in some embodiments to perform the calibration, the UE may transmit an UL calibration RS to the BS and request the BS to transmit a DL calibration RS. In response, the BS may determine, e.g., compute, UL channel estimates based on the UL calibration RS and transmit the UL channel estimates and DL calibration RS to the UE. The UL channel estimates may be explicitly transmitted as a data payload or implicitly transmitted in the form of the calibration applied by the BS to the DL calibration RS. The UE may determine, e.g., compute, DL channel estimates based on the DL calibration RS and the UL channel estimates from the BS. The UE may perform the calibration by determining calibration parameters (e.g., coefficients) for adjusting DL channel estimates such that a difference between the UL channel estimates and the DL channel estimates as adjusted by the calibration parameters (e.g., coefficients) is minimized. During normal operation, the UE may apply the calibration parameters to DL channel estimates computed from RSs transmitted by the BS for the purpose of deriving uplink channel estimates.

As another example, in other embodiments to perform the calibration, a first UE may transmit a first sidelink (SL) calibration RS to a second UE and request the second UE to transmit a second SL calibration RS back. In response, the second UE may determine, e.g., compute, the first SL channel estimates based on the first SL calibration RSs and transmit the first SL channel estimates and a second SL calibration RS to the first UE. The first UE may determine, e.g., compute, the second SL channel estimates based on the second SL calibration RS. The first UE may perform the calibration by determining calibration parameters (e.g., coefficients) for adjusting the second SL channel estimates such that a difference between the first SL channel estimates and the second SL channel estimates as adjusted by the calibration parameters (e.g., coefficients) is minimized. During normal operation, the first UE apply the calibration parameters to DL channel estimates computed from RSs transmitted by BS the for the purpose of deriving uplink channel estimates.

FIG. 1 illustrates a wireless communication network 100 according to embodiments of the present disclosure. The network 100 may include a number of UEs 102, as well as a number of BSs 104. The BSs 104 may include an eNodeB. A BS 104 may be a station that communicates with the UEs 102 and may also be referred to as a base transceiver station, a node B, an access point, and the like. Reference will be made herein generally to a "BS" for simplicity of discussion.

The BSs 104 communicate with the UEs 102 as indicated by communication signals 106. A UE 102 may communicate with the BS 104 via an UL and a DL. The DL (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108.

The UEs 102 may be dispersed throughout the network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104*a*, 104*b* and 104*c* are examples of macro BSs for the coverage areas 110*a*, 110*b* and 110*c*, respectively. The BSs 104*d* and 104*e* are examples of pico and/or femto BSs for the coverage areas 110*d* and 110*e*, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the DL and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, the BSs 104 may broadcast system information associated with the network 100. Some examples of system information may include physical layer information such as cell bandwidths and frame configurations, cell access information, and neighbor cell information. A UE 102 may access the network 100 by listening to the broadcast system information and requests connection or channel establishments with a BS 104. For example, the UE 102 may perform random access procedures to begin communication with the BS 104 and subsequently perform registration and/or connection procedures to register with the BS 104. After establishing the connection, the UE 102 and the BS 104 may enter a normal operation stage, where operational data may be exchanged.

In an embodiment, the network 100 may be a LTE (or more advanced network, such as LTE-A, 5G, etc.) network. In such an embodiment, the BSs 104 may assign or schedule transmission resources (e.g., in the form of time-frequency resource blocks) for DL and UL transmissions in the network 100. The communication may be in the form of radio frames. A radio frame may include a plurality of DL and UL subframe periods for DL and UL transmissions, respectively. The DL and UL subframe periods may be shared among the BSs 104 and the UEs 102, respectively. The DL subframe periods and the UL subframe periods may be further divided into several regions. For example, each DL or UL subframe period may have pre-defined regions for transmissions of reference signals, control information, and data. Control information may include resource assignments and protocol controls. Data may include protocol data and/or operational data. In some embodiments, the BSs 104 may coordinate with each other to cooperatively schedule, beam-form, and/ or transmit data in the network 100.

Reference signals are pre-determined signals that facilitate the communications between the BSs 104 and the UEs 102. For example, a reference signal may have a particular pilot pattern or structure, where pilot tones may span across an operational bandwidth or frequency band, each positioned at a pre-defined time and a pre-defined frequency. Thus, the BSs 104 may transmit DL reference signals and the UEs 102 may estimate DL channel states. Similarly, the UEs 102 may transmit UL reference signals and the BSs 104 may estimate UL channel states. The UEs 102 may subsequently recover DL data carried in DL signals transmitted by the BSs 104 based on the DL channel estimates. Similarly, the BSs 104 may subsequently recover UL data carried in UL signals transmitted by the UEs 102 based on the UL channel estimates. The UEs 102 may derive, determine, or implement UL channel information from corresponding DL channel estimates based on channel reciprocity from the BSs 104. In addition, the BSs 104 may derive or determine DL channel information from corresponding UL channel estimates based on channel reciprocity to perform scheduling and/or beamforming.

Figure 2:
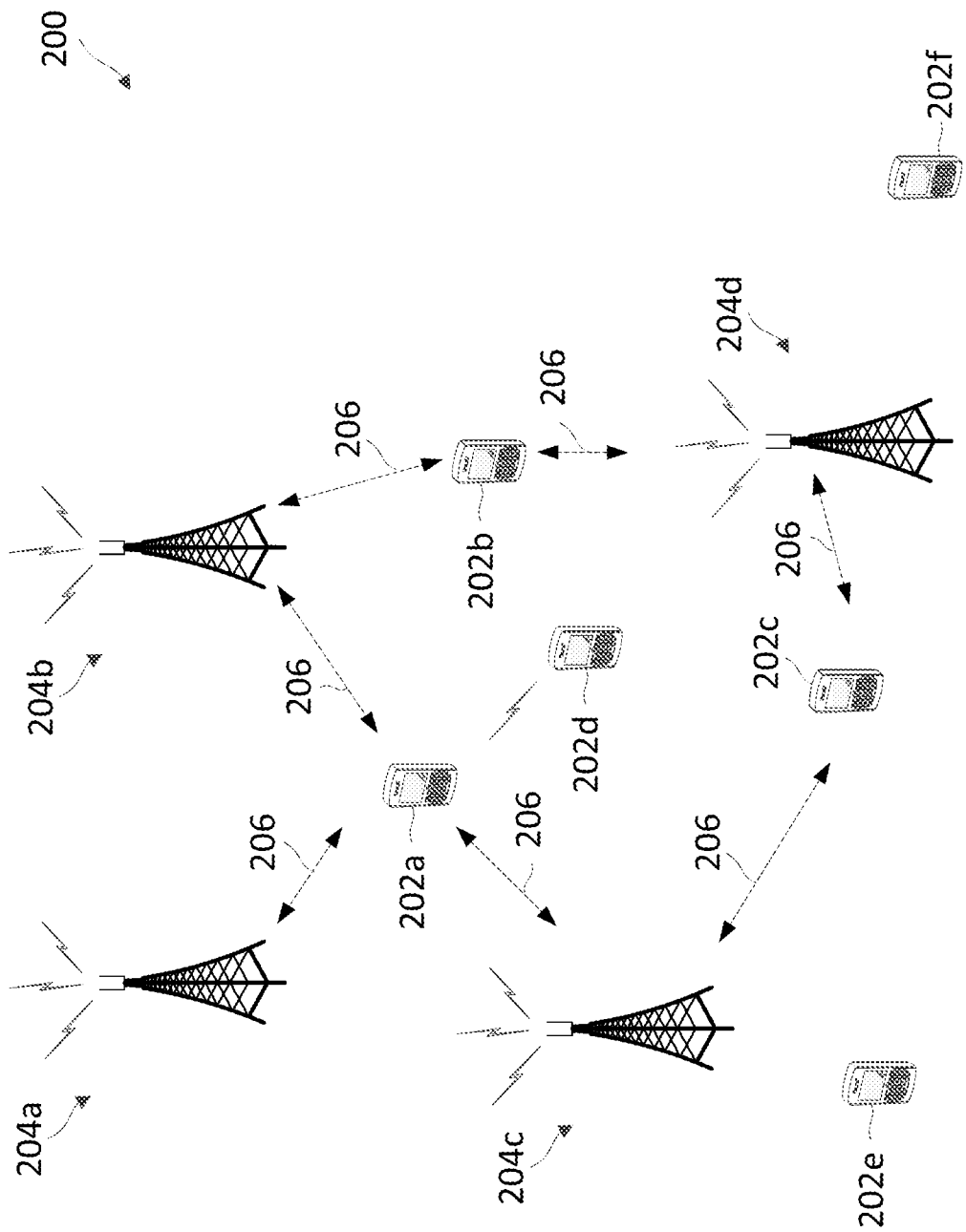
FIG. 2 illustrates a wireless communication network that performs over-the-air UL-DL reciprocity calibration according to embodiments of the present disclosure.

FIG. 2 illustrates a wireless communication network 200 which performs over-the-air UL-DL reciprocity calibration according to examples of the present disclosure. In particular, FIG. 2 illustrates a wireless communication network 200 where the UEs 102 may implement BS-assisted UE calibration at the UEs 102. The network 200 may include a plurality of BSs 204 in communication with a plurality of UEs 202. The BSs 204*a*, 204*b*, 204*c*, and 204*d* are geographically dispersed, cooperative BSs that cooperatively serve the UEs 202. For example, the UEs 202 may perform calibration in a calibration phase prior to sending data to the BSs 204 and may repeat the calibration periodically. For simplicity of discussion, focus will be on one UE 202 in describing aspects of the present disclosure.

To begin the calibration, a UE 202 may select one or more anchoring BSs 204*a*, 204*b*, 204*c*, 204*d*, 204*e*, and 204*f* for over-the-air calibration. For example, a BS 204 that has high link signal-to-noise ratio (SNR) to the UE 202 may be selected. As an example, the links 206 between the BSs 204a, 204b, and 204c and the UEs 202 in the illustrated example have high SNRs. Thus, the UE 202 may select any one (or more) of the BSs 204a, 204b, and 204c. The selected BS 204 may transmit a DL calibration reference signal (RS) to the requesting UE 202 so that the UE 202 may estimate the DL channel from the BS 204 to the UE 202. The DL calibration RS may be a pre-determined signal, for example, including a pre-defined pattern of pilot tones distributed across an operational frequency band in use by the BSs 204 and the UEs 202.

Similarly, each UE 202 may transmit an UL calibration RS to the selected BS 204 so that the BS 204 may estimate the UL channel from the UE to the selected BS 204. Alternatively, the UE 202 may broadcast the UL calibration RS to all BSs 204. The UL calibration RS may be a pre-determined signal, for example, including a pre-defined pattern of pilot tones distributed across the operational frequency band in use by the BSs 204 and the UEs 202. The DL calibration RS and the UL calibration RS may be the same or different. In addition, the UE 202 may transmit the DL channel estimates that the UE 202 determined to the selected BS 204. In some embodiments, the selected BS 204 may determine calibration parameters (e.g., coefficients) to account for mismatches between the UL channel estimates and the DL channel estimates, and transmit the subset of determined calibration parameters (e.g., coefficients) that are applicable for the UE 202. Alternatively, the BS 204 may transmit the UL channel estimates to the UE 202. In such embodiments, the UE 202 may determine its own calibration parameters (e.g., coefficients) to account for mismatches between the UL channel estimates and the DL channel estimates.

As another example, various UEs 202 within the wireless communication network 200 may communicate via one or more device to device (D2D) connections with each other to determine calibration parameters for implementation. Taking two UEs 202 from FIG. 2 as an example, UEs 202a and 2029d, the UE 202a may determine to perform a calibration procedure. The UE 202a therefore searches within its vicinity for another UE 202, for example based on SNR, and selects UE 202d. The UE 202a transmits a first sidelink (SL) calibration RS to the selected UE 202d, with a request that the selected UE 202d engage in the calibration procedure as well by at least transmitting in return a second SL calibration RS to the requesting UE 202a. The selected UE 202d may compute a first SL channel estimate of the first SL channel from the UE 202a to the UE 202d, and transmit the first SL channel estimate to the requesting UE 202a (along with the second SL calibration RS).

As described above, the transmission of the first SL channel estimate by the UE 202d may be an explicit transmission, i.e. expressly including the first SL channel estimate in a data payload for transmitting to the requesting UE 202a. Alternatively, the transmission of the first SL channel estimate may be implicit by modulating the gain and phase of the second SL calibration RS based on the first SL channel estimate. The first and second SL calibration RSs may be pre-determined signals, for example, including a pre-defined pattern of pilot tones distributed across the operational frequency band in use by the UEs 202 (and may be the same or different from each other). Upon receipt of the information from the UE 202d, the requesting UE 202a may determine its own calibration parameters (e.g., coefficients) after determining a second SL channel estimate between the UE 202d and the UE 202a. Further, the UE 202a may determine its own calibration parameters (e.g., coefficients) to account for mismatches between the first and second SL channel estimates. Concurrent to this, the UE 202d may perform a similar procedure. Alternatively UE 202a may determine calibration parameters on behalf of UE 202d and transmit them to the UE 202d.

Figure 3:
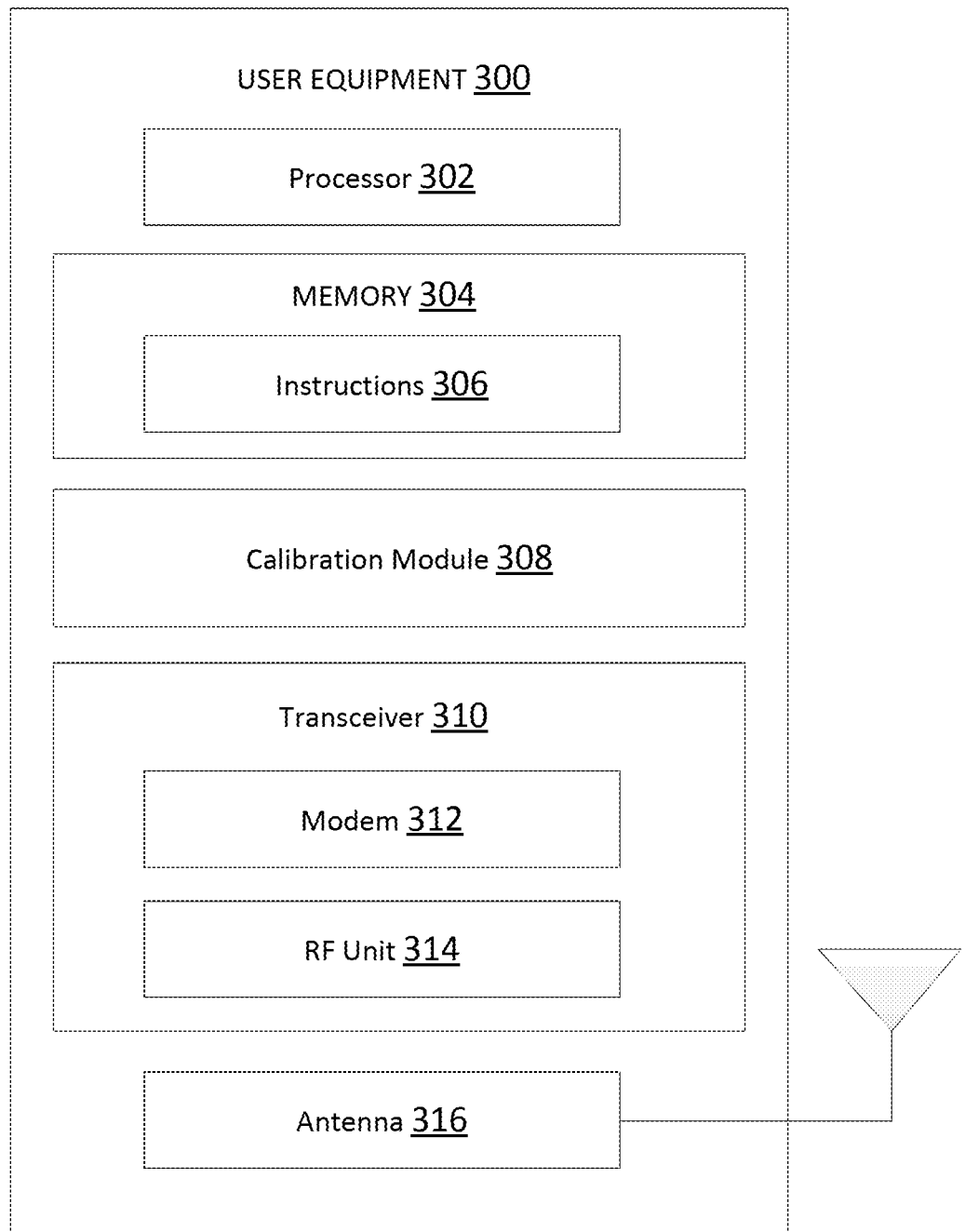
FIG. 3 is a block diagram of a user equipment (UE) according to embodiments of the present disclosure.

FIG. 3 is a block diagram of a UE 300 according to embodiments of the present disclosure. The UE 300 may be a UE 102 or 202 as discussed above. As shown, the UE 300 may include a processor 302, a memory 304, a calibration module 308, a transceiver 310 including a modem subsystem 312 and a radio frequency (RF) unit 314, and an antenna 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UE 300 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The calibration module 308 may be used for various aspects of the present disclosure. For example, the calibration module 308 is configured to generate UL calibration RSs and compute DL channel estimates to assist calibration at the UE 300 as described herein.

Further, according to some embodiments of the present disclosure, the calibration module 308 may be used at the UE 300 to compute calibration parameters (e.g., coefficients) for implementation at the UE 300, e.g. at one or more components of the transceiver 310 to address one or more possible RF chain imbalances at the UE 300. For example, the calibration module 308 may cause the processor 302 to direct the transceiver 310 to request a calibration procedure from one or more base stations in range.

The request for the calibration procedure may be a dynamic one, i.e. only on an as-needed basis. Alternatively, the BS may schedule periodic intervals in which a calibration procedure is scheduled to occur with the UE 300. The timing of these periodic intervals may range from once an hour (or more frequently than that) to once a day (or longer than that), to name some examples. In between calibrations, the UE 300 may use the calibration coefficients derived from the most recent calibration procedure to correct imbalances in the RF chain until the next calibration procedure is scheduled or dynamically requested (and completed with new resulting calibration parameters). As an example, dynamic requests may be triggered based on various conditions, for example upon the UE 300 analyzing one or more data transmission parameters of data received from the BS. As another alternative, the BS may request a calibration procedure occur, not the UE 300.

Whether a calibration procedure is requested by a UE 300 or a BS, in some embodiments of the present disclosure the UE 300 may perform UE calibration in cooperation with a BS, such as BS 104 or 204. To that end, the UE 300 in some embodiments may determine its calibration parameters (e.g., coefficients) to use in calibrating its RF chain to improve DL/UL reciprocity. For example, the UE 300 and the BS 204 may exchange calibration reference signals after a calibration procedure has begun (whether scheduled or dynamically requested). The calibration module 308 may cause the UE 300 to transmit a UL calibration RS to the BS 204, for example a form of sounding reference signal (SRS). Further, the calibration module 308 may receive a DL calibration RS (e.g., a form of channel state information reference signal, CSI-RS) from the BS 204.

With the receipt of the DL calibration RS, the calibration module 308 may, in cooperation with the processor 302, determine a DL channel estimate based on the DL calibration RS. The BS 204 may analogously determine an UL channel estimate based on the UL calibration RS that the UE 300 sent. In some embodiments, the BS 204 may transmit the UL channel estimate to the UE 300 via explicit signaling. For example, after sending a DL calibration RS, and after determining the UL channel estimate, the BS 204 may insert the UL channel estimate into a data payload to the UE 300, such as on PDSCH. This explicitly signals the UE 300 the UL channel estimate. Then, the calibration module 308 may compare the DL channel estimate made at the UE 300 to the UL channel estimate received (or derived from) the BS 204.

Alternatively, the BS 204 may implicitly convey the UL channel estimate to the UE 300. According to this example, instead of taking up PDSCH resources, the BS 204 may modulate the DL calibration RS in amplitude and/or phase to take into account the UL channel estimate. The UE 300 may receive this modulated DL calibration RS, and the calibration module 308 may compute the calibration parameters based on the UL-channel-modulated DL calibration RS. The calibration module 308 may convey the calibration coefficients for storage in the memory 304 and implementation by the processor 302 to the transceiver 310.

According to other embodiments, determination of the calibration parameters (e.g., coefficients) may be performed by the BS 204 (e.g., by a calibration module 408 discussed with respect to FIG. 4 below). For example, the calibration module 308 may, in cooperation with the processor 302, determine a DL channel estimate based on the DL calibration RS. Further, the calibration module 308 may cause the UE 300 to transmit the DL channel estimate to the BS 204, for example via explicit signaling (including the DL channel estimate in a data payload, such as via PUSCH) or implicit signaling by modulating amplitude and/or phase of a subsequent UL calibration RS. The BS 204 may determine calibration coefficients for the UE 300 during the BS 204's procedure in determining its own calibration coefficients. As a result, the BS 204 may transmit the calibration coefficients for the UE 300. Upon receipt via the transceiver 310, the calibration module 308 may direct the processor 302 to store the coefficients for the UE 300 in memory 304 as well as implement with the transceiver 310.

In alternative embodiments, instead of communicating with a BS to perform calibration, the UE 300 may communicate with a peer UE. For example, the calibration module 308 may cause the processor 302 to direct the transceiver 310 to request a calibration procedure from a neighboring UE that is capable of device to device (D2D) communications with the UE 300. The request for the calibration procedure may be a dynamic one, i.e. only on an as-needed basis with UEs in D2D communication with the UE 300, or alternatively still occur according to a schedule, either determined by a serving BS 204 or as negotiated between the UEs.

For example, after establishing the D2D communication (e.g., via a side link), the UE 300 and the nearby UE may exchange calibration reference signals after a calibration procedure has begun (whether scheduled or dynamically requested). The calibration module 308 may cause the UE 300 to transmit a first SL calibration RS to the nearby UE. Further, the calibration module 308 may receive a second SL calibration RS from the nearby UE.

With the receipt of the second SL calibration RS, the calibration module 308 may, in cooperation with the processor 302, determine a second SL channel estimate based on the second SL calibration RS. The nearby UE may analogously determine a first SL channel estimate based on the first SL calibration RS that the UE 300 sent. In some embodiments, the nearby UE may transmit the first SL channel estimate to the UE 300 via explicit signaling. For example, after sending the second SL calibration RS, and after determining the first SL channel estimate, the nearby UE may insert the first SL channel estimate into a data payload to the UE 300, such as on a physical sidelink shared channel (PSSCH). This explicitly signals the UE 300 the first SL channel estimate. The calibration module 308 may compare the second SL channel estimate made at the UE 300 to the first SL channel estimate received from the nearby UE. The calibration parameters (e.g., coefficients) for the UE 300 may be the result of this comparison and computations by the calibration module 308.

Alternatively, the nearby UE may implicitly convey the first SL channel estimate to the UE 300. According to this example, instead of taking up PSSCH resources, the nearby UE may modulate the second SL calibration RS in amplitude and/or phase to take into account the first SL channel estimate. The UE 300 may receive this modulated second SL calibration RS, and the calibration module 308 may compute calibration parameters (e.g., coefficients). Just like the other embodiments above, the calibration module 308 may convey the calibration coefficients for storage in the memory 304 and implementation by the processor 302 to the transceiver 310.

As shown, the transceiver 310 may include the modem subsystem 312 and the RF unit 314. The transceiver 310 can be configured to communicate bi-directionally with other devices, such as the BSs 104 and 204 and UEs 102 and 202. The modem subsystem 312 may be configured to modulate and/or encode the data from the memory 304 and/or the calibration module 308 according to a modulation and coding scheme (MCS), e.g., a low-density parity check (LDPC) coding scheme, a turbo coding scheme, a convolutional coding scheme, etc. The RF unit 314 may be configured to process (e.g., perform analog to digital conversion or digital to analog conversion, etc.) modulated/ encoded data from the modem subsystem 312 (on outbound transmissions) or of transmissions originating from another source such as a UE 102 or a BS 104. Although shown as integrated together in transceiver 310, the modem subsystem 312 and the RF unit 314 may be separate devices that are coupled together at the UE 102 to enable the UE 102 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of a UL calibration RS or a DL channel estimate (or, in some embodiments, a SL calibration RS or SL channel estimate to another UE 102) according to embodiments of the present disclosure. The antenna 316 may further receive data messages transmitted from other devices. This may include, for example, reception of a DL calibration RS and a calibration request (or a SL calibration RS and a calibration request from another UE 102) according to embodiments of the present disclosure. The antenna 316 may provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
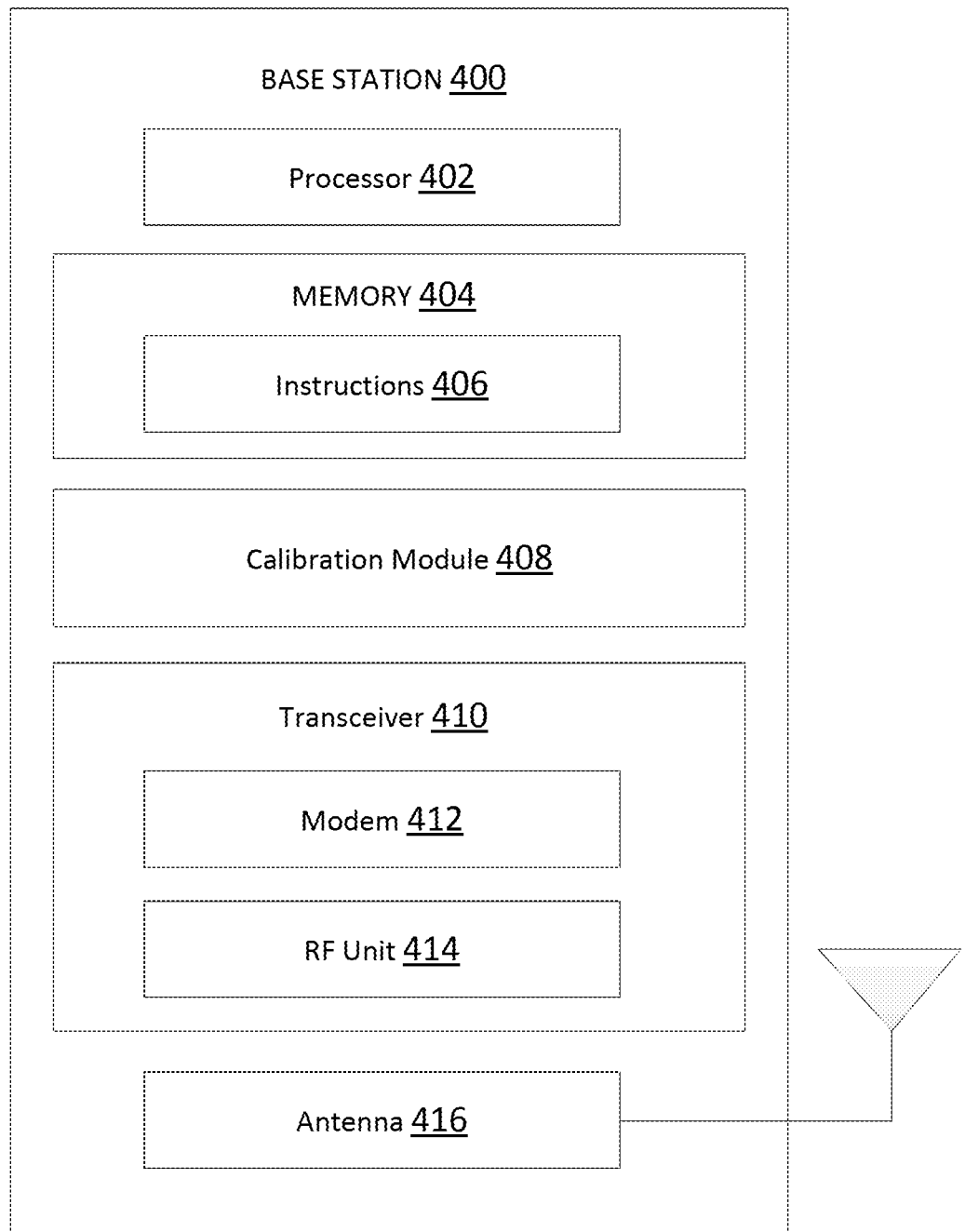
FIG. 4 illustrates a block diagram of a base station (BS) according to embodiments of the present disclosure.

FIG. 4 illustrates a block diagram of an exemplary BS 400 according to embodiments of the present disclosure. The BS 400 may be a BS 104 or 204 as discussed above. A shown, the BS 400 may include a processor 402, a memory 404, a calibration module 408, a transceiver 410 including a modem subsystem 412 and a RF unit 414, and an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 3.

The calibration module 408 may be used for various aspects of the present disclosure. For example, the calibration module 408 may generate DL calibration RSs, compute UL channel estimates, determine calibration coefficients, and apply the calibration coefficients to UL channel estimates. In some embodiments, the calibration module 408 may store the computed calibration coefficients in the memory 404 for subsequent application to the RSs.

Further, according to some embodiments of the present disclosure, the calibration module 408 may be used at the BS 400 to compute calibration parameters (e.g., coefficients) for implementation at the BS 400 (e.g. at one or more components of the transceiver 410 to address one or more possible RF chain imbalances at the BS 400) and, in some embodiments, calibration parameters for implementation at a UE. For example, the calibration module 408 may cause the processor 402 to direct the transceiver 410 to request a calibration procedure from one or more UEs in range.

The request for the calibration procedure may be a dynamic one or scheduled one, as already discussed above with respect to FIG. 3. Whether a calibration procedure is requested by a UE or a BS 400, in some embodiments of the present disclosure the BS 400 may perform BS calibration (and potentially UE calibration as a by-product) in cooperation with a UE, such as UE 102 or 202. To that end, the BS 400 in some embodiments may determine its calibration parameters (e.g., coefficients) to use in calibrating its RF chain to improve DL/UL reciprocity as well as calibration parameters (e.g., coefficients) for the UE 202 to use in calibration the UE 202's RF chain. For example, the BS 400 and UE 202 may exchange calibration reference signals after a calibration procedure has begun (whether scheduled or dynamically requested). The calibration module 408 may cause the BS 400 to transmit a DL calibration RS to the UE 202. Further, the calibration module 408 may receive an UL calibration RS from the UE 202.

With the receipt of the UL calibration RS, the calibration module 408 may, in cooperation with the processor 402, determine an UL channel estimate based on the UL calibration RS. The UE 202 may analogously determine a DL channel estimate based on the DL calibration RS that the BS 400 sent. In some embodiments, the UE 202 may transmit the DL channel estimate to the BS 400 via explicit signaling, similar to the approach described with respect to FIG. 3 above, albeit on PUSCH instead of PDSCH. This explicitly signals the BS 400 the DL channel estimate. Alternatively, the UE 202 may implicitly convey the DL channel estimate to the BS 400, in similar manner with respect to amplitude and/or phase modulation as discussed above, but for the UL calibration RS. The BS 400 may receive this modified UL calibration RS, and the calibration module 408 may compute the calibration parameters.

As a result, the BS 400 may transmit the calibration coefficients for the UE 202 to the UE 202, which in turn may store the UE coefficients and implement with the transceiver of the UE 202.

As shown, the transceiver 410 may include the modem subsystem 412 and the RF unit 414. The transceiver 410 can be configured to communicate bi-directionally with other devices, such as the UEs 102 and 202 and/or another core network element. The modem subsystem 412 may be configured to modulate and/or encode data according to a MCS, e.g., a LDPC coding scheme, a turbo coding scheme, a convolutional coding scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102. Although shown as integrated together in transceiver 410, the modem subsystem 412 and the RF unit 414 may be separate devices that are coupled together at the BS 104 to enable the BS 104 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of a DL calibration RS, an UL channel estimate (explicitly or implicitly), and/or UE calibration parameters according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5A:
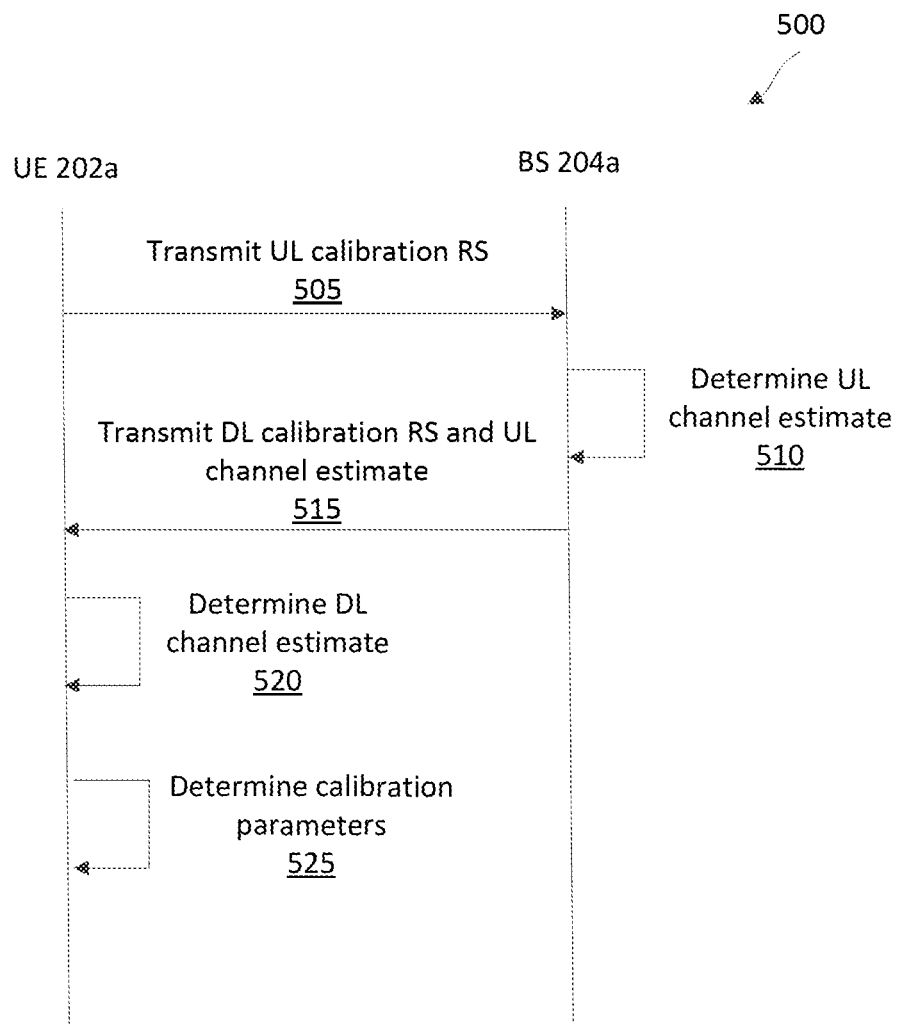
FIG. 5A is a protocol diagram of a method of wireless communication according to embodiments of the present disclosure.

FIG. 5A is a protocol diagram of a method 500 of wireless communication according to embodiments of the present disclosure. Aspects of the method 500 may be executed by computing devices (e.g., a processor, processing circuit, and/or other suitable component) of wireless communication devices, such as the BSs 104, 204, and 400 and the UEs 102, 202, and 300. The method 500 can be better understood with reference to FIG. 2. As illustrated, the method 500 includes a number of enumerated actions, but examples of the method 500 may include additional actions before, after, and in between the enumerated actions. In some examples, one or more of the enumerated actions may be omitted or performed in a different order. The method 500 illustrates a BS 204a and a UE 202a for purpose of simplicity of discussion, though it will be recognized that embodiments of the present disclosure may be used by other UEs 202 and/or BSs 204.

At action 505, the UE 202a transmits an UL calibration RS to the BS 204a. In addition to the UL calibration RS, the UE 202a may also transmit therewith a request for calibration to the BS 204a to trigger the BS 204 to engage in the calibration procedure with the UE 202a.

At action 510, the BS 204a determines an UL channel estimate based on the UL calibration RS.

At action 515, the BS 204a transmits the determined UL channel estimate and a DL calibration RS to the UE 202a to facilitate UL-DL reciprocity calibration. For example, in an embodiment the BS 204a may transmit an additional DL calibration RS, followed by a data payload that explicitly identifies the UL channel estimate determined by the BS 204a. In another embodiment, the BS 204a may transmit the additional DL calibration RS as modified in amplitude and/or phase to take into account the UL channel estimate, but not explicitly signaled in a data payload the UL channel estimate.

At action 520, the UE 202a determines a DL channel estimate based on the DL calibration RS.

At action 525, the UE 202a determines calibration parameters based on the UL and DL channel estimates. For example, the UL channel estimate may be received either explicitly as noted above as part of a data payload (such as on PDSCH) or implicitly signaled based on the difference in the DL calibration RS from a prior DL calibration RS (e.g., either part of the current procedure or received previously such as in a prior period).

The calibration parameters may be saved by the UE 202a and may be implemented by the UE 202 such that a difference between the UL channel estimates and the DL channel estimates as adjusted by the calibration parameters is minimized in subsequent transmissions to at least the BS 204a.

Figure 5B:
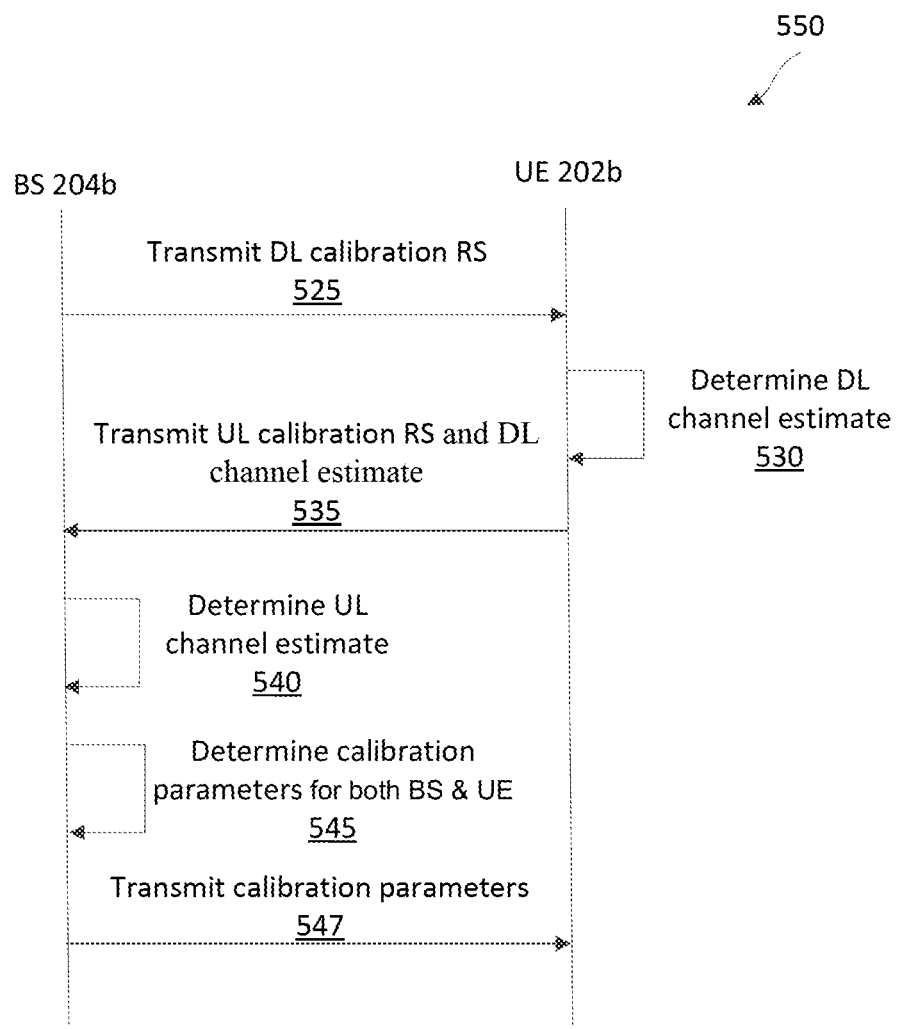
FIG. 5B is a protocol diagram of a method of wireless communication according to embodiments of the present disclosure.

FIG. 5B is a protocol diagram of a method 550 of wireless communication according to embodiments of the present disclosure. Aspects of the method 550 may be executed by computing devices (e.g., a processor, processing circuit, and/or other suitable component) of wireless communication devices, such as the BSs 104, 204, and 400 and the UEs 102, 202, and 300. The method 550 can be better understood with reference to FIG. 2. As illustrated, the method 550 includes a number of enumerated actions, but examples of the method 550 may include additional actions before, after, and in between the enumerated actions. In some examples, one or more of the enumerated actions may be omitted or performed in a different order. The method 550 illustrates a BS 204b and a UE 202b for purpose of simplicity of discussion, though it will be recognized that embodiments of the present disclosure may be used by other UEs 202 and/or BSs 204.

At action 525, the BS 204b transmits a DL calibration RS to the UE 202b. In addition to the DL calibration RS, the BS 204b may also transmit therewith a request for calibration to the UE 202b to trigger the UE 202b to engage in the calibration procedure with the BS 204b.

At action 530, the UE 202b determines a DL channel estimate based on the DL calibration RS received from the BS 204b.

At action 535, the UE 202b transmits the determined DL channel estimate and an UL calibration RS to the BS 204b to facilitate UL-DL reciprocity calibration. For example, the UE 202b may explicitly signal the DL channel estimate as a data payload (e.g., via PUSCH). As another example, the UE 202b may implicitly signal the DL channel estimate by modifying the UL calibration RS in amplitude and/or phase to take into account the DL channel estimate.

At action 540, the BS 204b determines a UL channel estimate based on the UL calibration RS.

At action 545, the BS 204b determines calibration parameters, for both BS and UE, based on the UL and DL channel estimates. For example, the BS 204b may use the UL channel estimate as explicitly signaled from the UE 202b, or as derived from any differences between the UL calibration RS and one or more prior UL calibration RSs received from the UE 202b (e.g., either as part of the current procedure or received previously such as in a prior period). The BS 204b may determine calibration parameters both for the BS 204b as well as for the UE 202b—for example, in determining the calibration parameters for the BS 204b, the BS 204b may as a result also determine the calibration parameters for the UE 202b.

At action 547, the calibration parameters determined for the UE 202b are transmitted to the UE 202b, for example as a data payload on PDSCH. The calibration parameters may be saved by the UE 202b and may be implemented by the UE 202b such that a difference between the UL channel estimates and the DL channel estimates as adjusted by the calibration parameters is minimized in subsequent transmissions to at least the BS 204b.

Figure 5C:
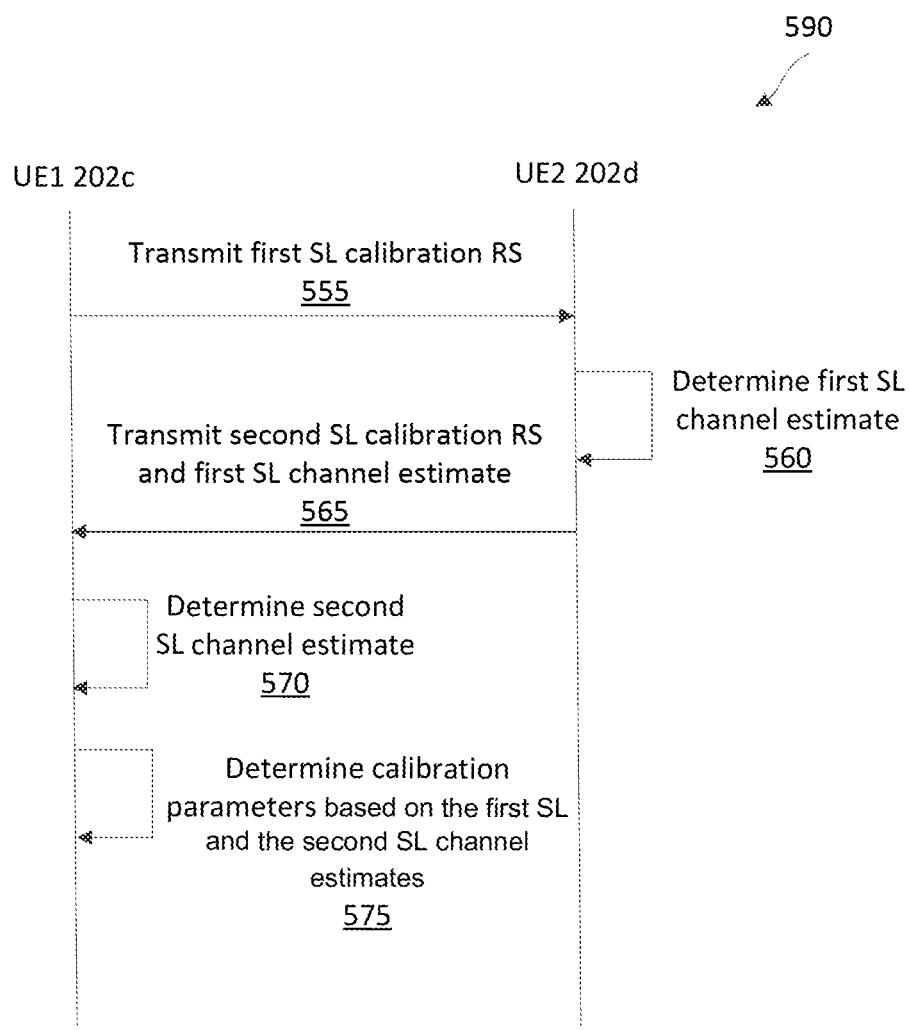
FIG. 5C is a protocol diagram of a method of wireless communication according to embodiments of the present disclosure.

FIG. 5C is a protocol diagram of a method 590 of wireless communication according to embodiments of the present disclosure. Aspects of the method 590 can be executed by computing devices (e.g., a processor, processing circuit, and/or other suitable component) of wireless communication devices, such as the UEs 102, 202, and 300. The method 590 can be better understood with reference to FIG. 2. As illustrated, the method 590 includes a number of enumerated actions, but embodiments of the method 590 may include additional actions before, after, and in between the enumerated actions. In some embodiments, one or more of the enumerated actions may be omitted or performed in a different order. The method 590 illustrates a UE 202c and a UE 202d for purpose of simplicity of discussion, though it will be recognized that embodiments of the present disclosure may be used by any other two UEs 202.

At action 555, the UE 202c transmits a first SL calibration RS to the UE 202d. The UE 202c may also transmit therewith a request for calibration to the UE 202d to trigger the UE 202d to engage in the calibration procedure with the UE 202c.

At action 560, the UE 202d determines a first SL channel estimate based on the first SL calibration RS.

At action 565, the UE 202d transmits the determined first SL channel estimate and a second SL calibration RS to the UEs 202c to facilitate SL-SL reciprocity calibration. For example, in an embodiment the UE 202d may transmit the second SL calibration RS, followed by a data payload that explicitly identifies the first SL channel estimate determined by the UE 202d. This may be provided on a physical sidelink shared channel (PSSCH). In another embodiment, the UE 202d may transmit the second SL calibration RS as modified in amplitude and/or phase to take into account the first SL channel estimate, but not explicitly signal in a data payload the first SL channel estimate.

At action 570, the UE 202c determines a second SL channel estimate based on the second SL calibration RS.

At action 575, the UE 202c determines calibration parameters based on the first SL and the second SL channel estimates. For example, where received as an explicit data payload, the UE 202c may use the first SL channel estimate together with the second SL channel estimate determined at action 570. As another example, where received implicitly, the UE 202c first extracts the first SL channel estimate by comparing the properties (e.g., amplitude and/or phase) of the second SL calibration RS with that of a prior SL calibration RS from the UE 202d to the UE 202c.

The calibration parameters may be saved by the UE 202c and may be implemented by the UE 202c such that a difference between the first SL channel estimates and the second SL channel estimates as adjusted by the calibration parameters is minimized.

Figure 6A:
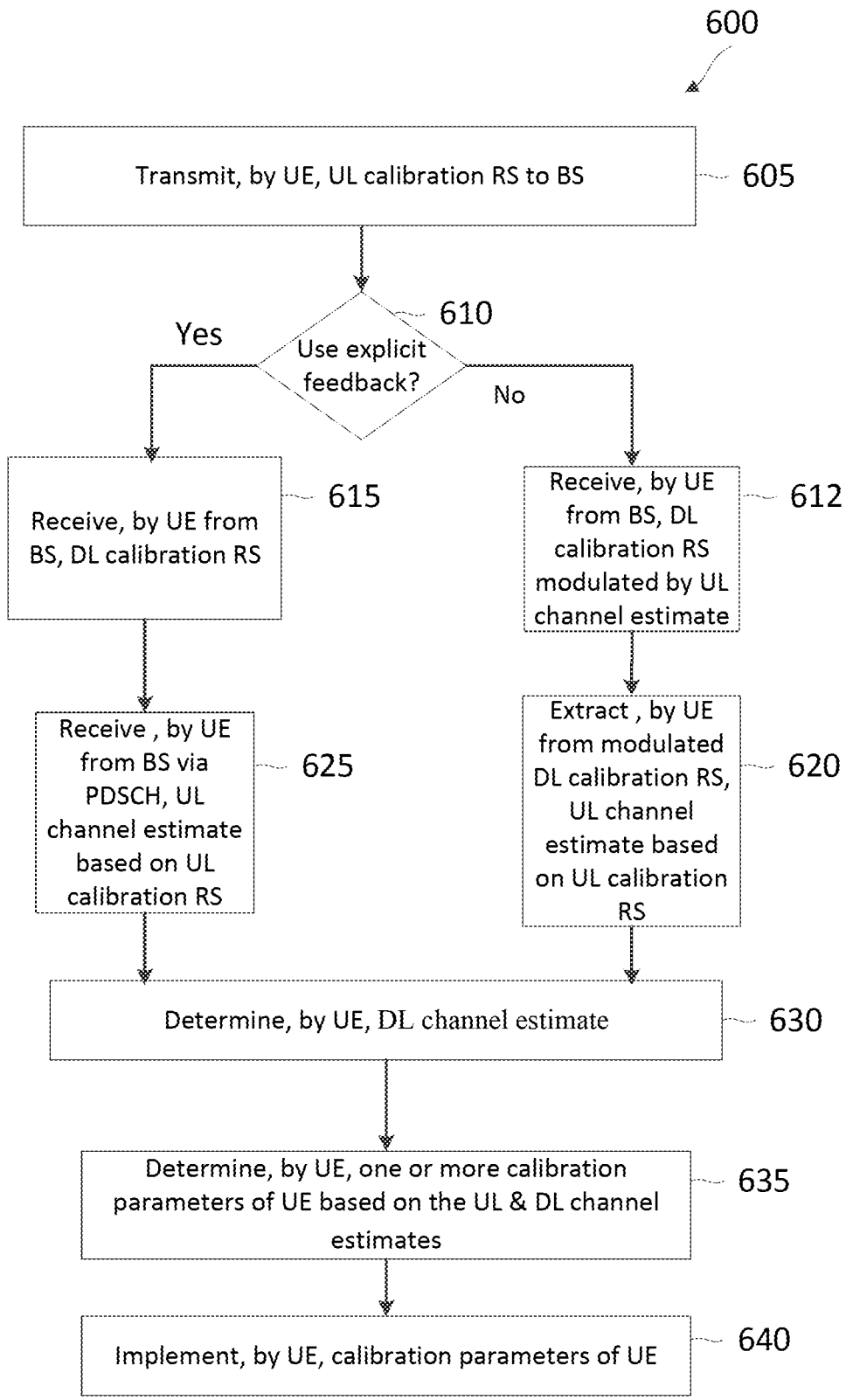
FIG. 6A is a flow diagram of a method of wireless communication according to embodiments of the present disclosure.

FIG. 6A is a flow diagram of a method 600 of wireless communication according to embodiments of the present disclosure. Aspects of the method 600 can be executed by a computing device (e.g., a processor, processing circuit, and/or other suitable component) of a wireless communication device, such as the UEs 102, 202, and 300. The method 600 may employ similar mechanisms as in the method 500. The method 600 can be better understood with reference to FIG. 2. As illustrated, the method 600 includes a number of enumerated steps, but examples of the method 600 may include additional steps before, after, and in between the enumerated steps. In some examples, one or more of the enumerated steps may be omitted or performed in a different order.

At block 605, the method 600 includes transmitting, by a UE (e.g., the UE 202a), an UL calibration RS to a BS (e.g., the BS 204a). Further, the UE 202a may transmit a calibration request to trigger the BS 204a to engage in the calibration procedure with the UE 202a.

At decision block 610, the UE determines whether the BS is using explicit feedback or implicit feedback to provide the UL channel estimate of the BS.

If the BS is using explicit feedback, then the method 600 proceeds from decision block 610 to block 615. At block 615, the UE receives a DL calibration RS from the BS. For example, the DL calibration RS is received in response to the transmitting the UL calibration RS to the BS.

At block 625, the UE receives the UL channel estimate from the BS as an explicit data payload, for example via a physical DL shared channel (PDSCH). The UL channel estimate is based on the UL calibration RS.

Returning to decision block 610, if the BS is using implicit feedback, then the method 600 proceeds to block 612 instead of block 615. At block 612, the UE receives the DL calibration RS from the BS, where the DL calibration RS has been modulated by the BS (e.g., amplitude and/or phase) according to the result of the UL channel estimate at the BS. For example, the modulated DL calibration RS is received in response to UL calibration RS transmitted from the UE to the BS at block 605.

At block 620, the UE extracts the UL channel estimate from the modulated DL calibration RS, for example by determining the UL channel estimate from the differences between a DL calibration RS and the modulated DL calibration RS.

From either block 620 or 625, the method 600 proceeds to block 630. At block 630, the UE determines a DL channel estimate based on the received DL calibration RS.

At block 635, the UE determines one or more calibration parameters of the UE based on the UL and DL channel estimates. The UE may save the calibration parameters that it determined at block 630. In alternative embodiments, where implicit feedback is used, the UE may determine one or more calibration parameters of the UE from the modulated DL calibration RS, thereby moving from block 612 to block 635 (e.g., without blocks 620 and 630 as separate, distinct actions, thus without obtaining separate DL and UL channel estimates before determining the calibration parameters).

At block 640, the UE implements the one or more calibration parameters such that a difference between the UL channel estimate and the DL channel estimate as adjusted by the calibration parameters is minimized in subsequent transmissions to the BS.

In some embodiments at block 605, the UE transmits the UL calibration RS to a plurality of base stations. In response at blocks 612 or 615 and 625, the UE receives a DL calibration RS and a UL channel estimate from the plurality of base stations (e.g., a different UL channel between the different base stations and the UE).

Figure 6B:
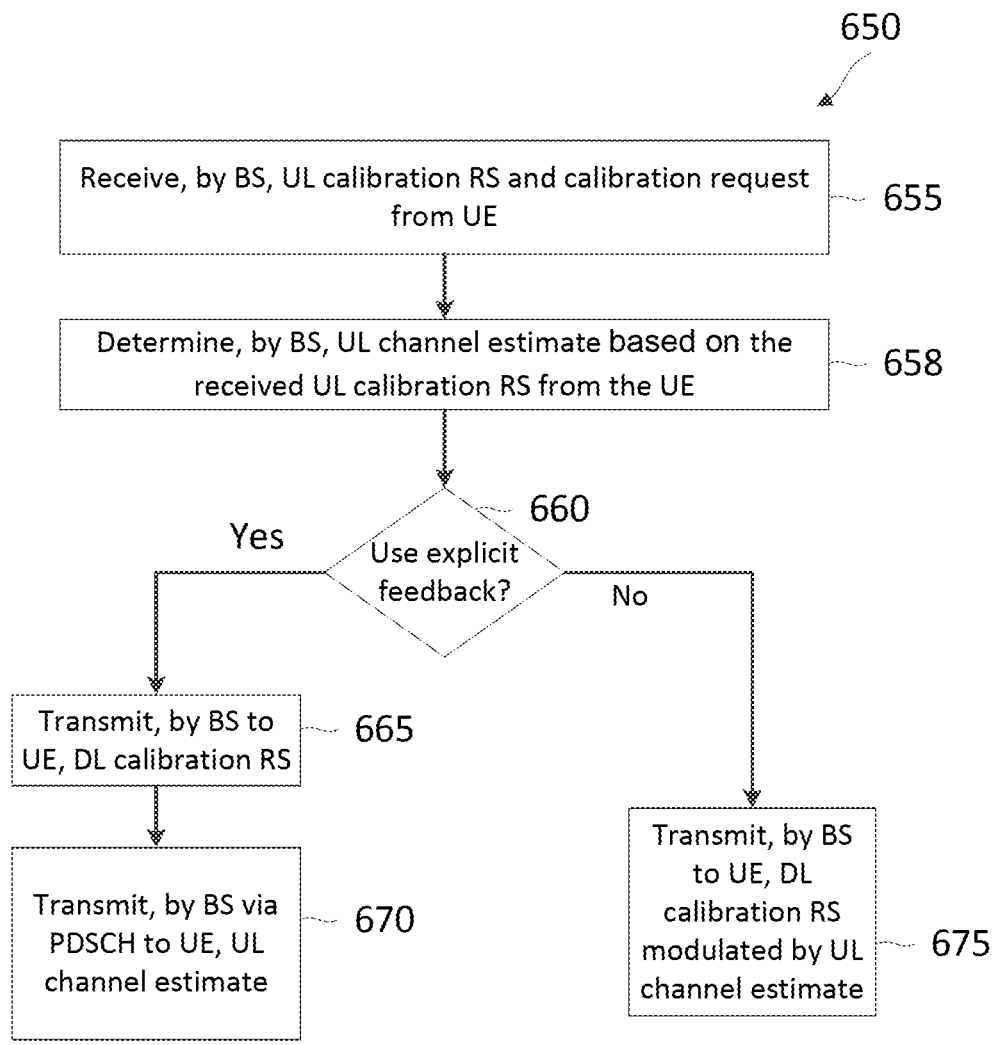
FIG. 6B is a flow diagram of a method of wireless communication according to embodiments of the present disclosure.

FIG. 6B is a flow diagram of a method 650 of wireless communication according to embodiments of the present disclosure. Aspects of the method 650 can be executed by a computing device (e.g., a processor, processing circuit, and/or other suitable component) of a wireless communication device, such as the BSs 104, 204, and 400. The method 650 may employ similar mechanisms as in the method 500. The method 650 can be better understood with reference to FIG. 2. As illustrated, the method 650 includes a number of enumerated actions, but examples of the method 650 may include additional actions before, after, and in between the enumerated actions. In some examples, one or more of the enumerated actions may be omitted or performed in a different order.

At block 655, a BS (e.g., the BS 204b) receives an UL calibration RS from a UE (e.g., the UE 202b). Further, the BS 204b may receive a calibration request from the UE 202b to trigger the BS 204b to engage in the calibration procedure with the UE 202a.

At block 658, the BS determines an UL channel estimate based on the received UL calibration RS from the UE.

At decision block 660, if the BS transmits the UL channel estimate via explicit feedback to the UE (i.e., via PDSCH), then the method 650 proceeds to block 665.

At block 665, the BS transmits a DL calibration RS to the UE in response to the calibration request received at block 655. For example, the DL calibration RS is transmitted in response to receiving the UL calibration RS from the UE.

At block 670, the BS places the UL channel estimate as a data payload into a PDSCH transmission and transmits to the UE.

Returning to decision block 660, if the BS transmits the UL channel estimate via implicit feedback, then the method 650 proceeds instead to block 675.

At block 675, the BS modulates its DL calibration RS (e.g., amplitude and/or phase) based on the UL channel estimate from block 658 and transmits the modulated DL calibration RS to the UE. In some examples, the BS may transmit to the UE, a next DL calibration RS that has been modified based on the UL channel estimate. Then the UE may extract the UL channel estimate from the next DL calibration RS based on a comparison to a prior DL calibration RS received from the BS. In some examples, the UE may use the received DL calibration RS to determine a DL channel estimate based on the received DL calibration RS and may further determine one or more calibration parameters based on differences between the UL and DL channel estimates. The calibration parameters may be saved by the UE for subsequent use in transmitting data to at least the BS.

Figure 7A:
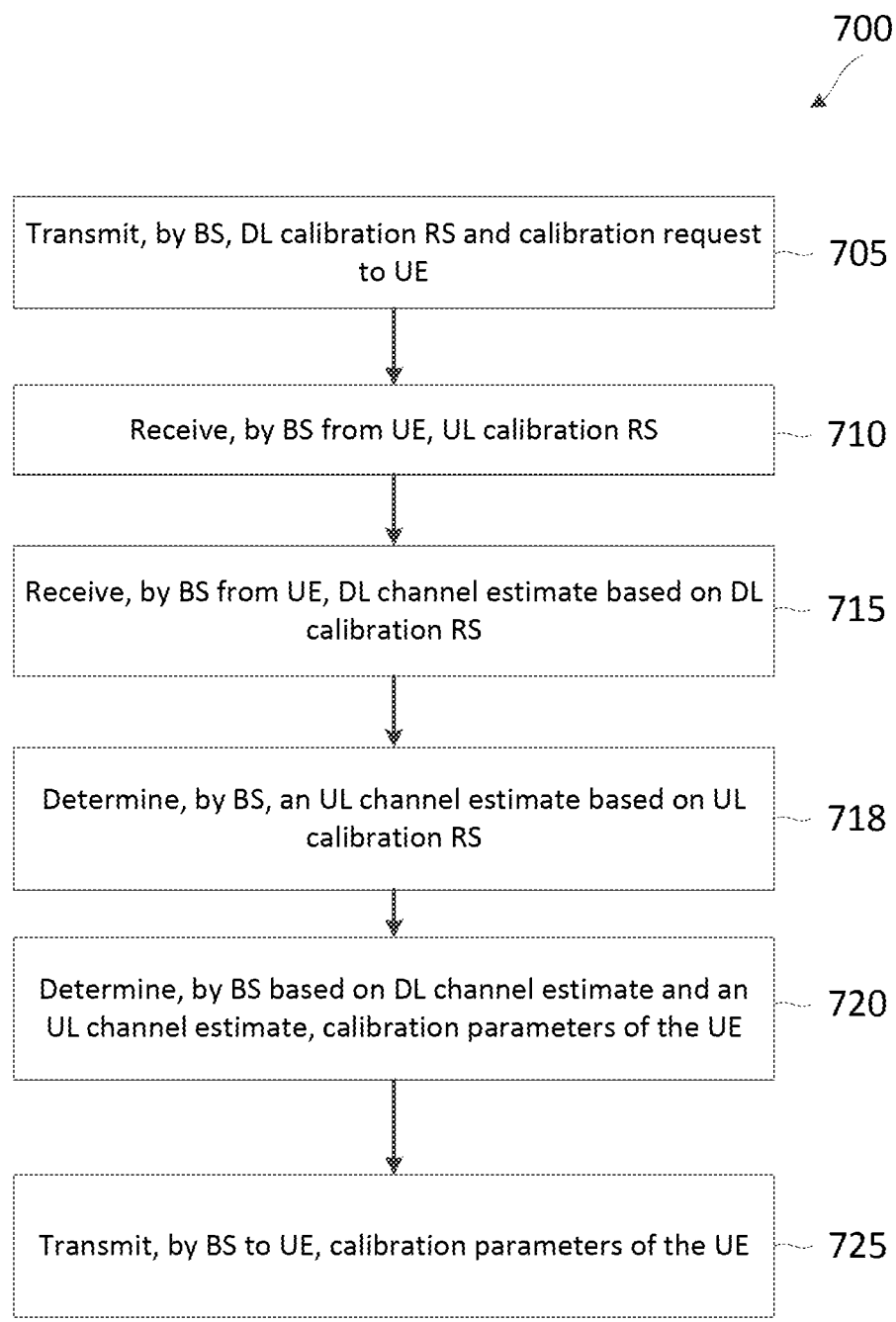
FIG. 7A is a flow diagram of a method of wireless communication according to embodiments of the present disclosure.

FIG. 7A is a flow diagram of a method 700 of wireless communication according to examples of the present disclosure. Aspects of the method 700 can be executed by a computing device (e.g., a processor, processing circuit, and/or other suitable component) of a wireless communication device, such as the BSs 104, 204, and 400. The method 700 may employ similar mechanisms as in the method 550. The method 700 can be better understood with reference to FIG. 2. As illustrated, the method 700 includes a number of enumerated actions, but examples of the method 700 may include additional actions before, after, and in between the enumerated actions. In some examples, one or more of the enumerated actions may be omitted or performed in a different order.

At block 705, a BS (e.g., the BS 204b) transmits a DL calibration RS to a UE (e.g., the UE 202b). In addition, the BS may transmit a request for calibration to the UE to trigger engagement in the calibration procedure. In some examples, a DL channel estimate is determined by the UE based on the DL calibration RS transmitted to the UE.

At block 710, the BS receives an UL calibration RS from the UE. For example, the UL calibration RS is transmitted by the UE in response to the DL calibration RS transmitted to the UE.

At block 715, the BS receives the DL channel estimate from the UE (e.g., together with the transmission of UL calibration RS or at some point thereafter). In some embodiments, the DL channel estimate may be signaled explicitly via data payload (e.g., via PUSCH). In other embodiments, the DL channel estimate may be extracted from a modified UL calibration RS that has been modulated (e.g., amplitude and/or phase) based on the DL channel estimate at the UE.

At block 718, the BS determines an UL channel estimate based on the UL calibration RS received from the UE.

At block 720, the BS determines, based on the DL channel estimate (either explicitly received or derived from a modulated UL calibration RS, for example) and the UL channel estimate from block 718, one or more calibration parameters of the UE. The one or more calibration parameters may be determined for example based on differences calculated between the UL and DL channel estimates. As part of determining the calibration parameters, the BS may determine calibration parameters for the BS as well as for the UE (e.g., as a byproduct of determining the parameters for the BS).

At block 725, the BS transmits the one or more calibration parameters for the UE to the UE. The transmission may include placing the one or more calibration parameters for the UE into a data payload for transmission via PDSCH.

Figure 7B:
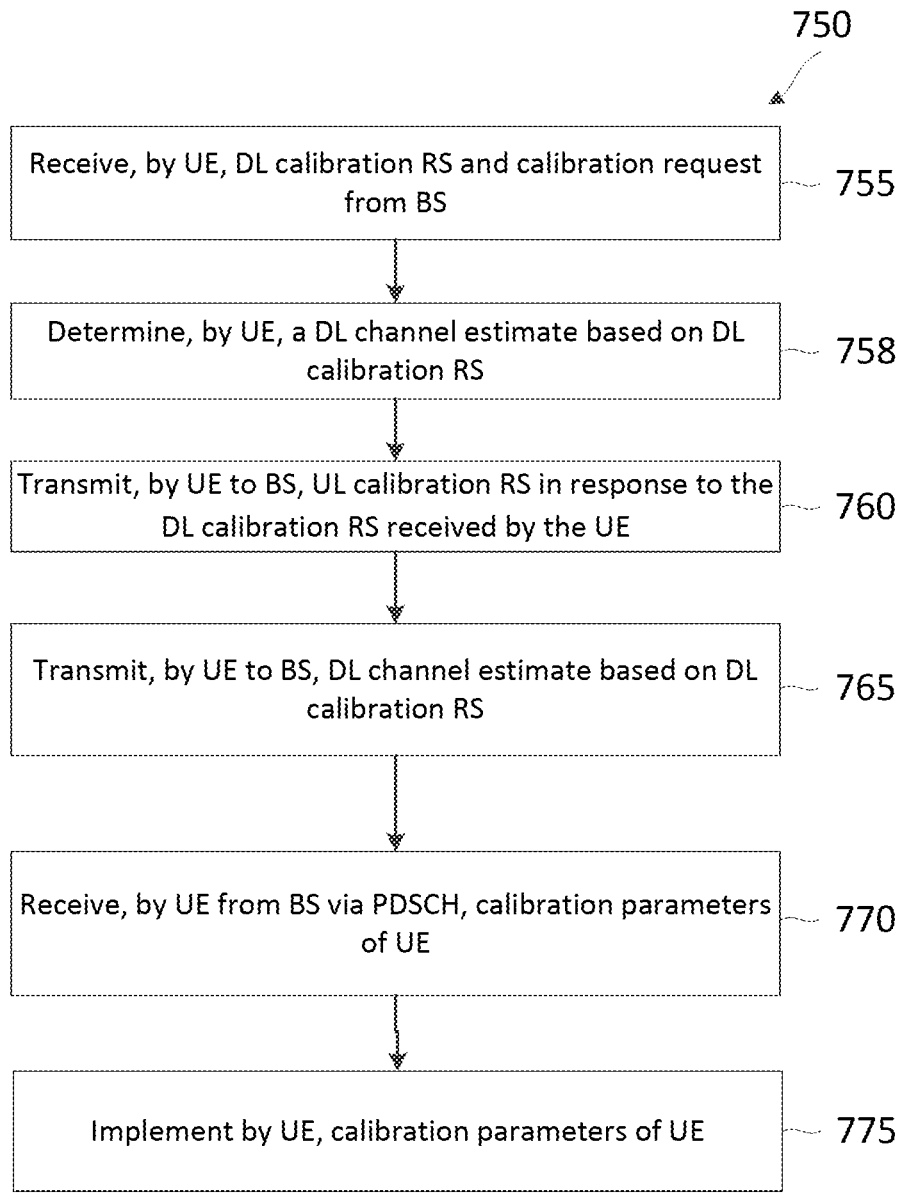
FIG. 7B is a flow diagram of a method of wireless communication according to embodiments of the present disclosure.

FIG. 7B is a flow diagram of a method 750 of wireless communication according to embodiments of the present disclosure. Steps of the method 750 can be executed by a computing device (e.g., a processor, processing circuit, and/or other suitable component) of a wireless communication device, such as the UEs 102, 202, and 300. The method 750 may employ similar mechanisms as in the method 550. The method 750 can be better understood with reference to FIG. 2. As illustrated, the method 750 includes a number of enumerated actions, but examples of the method 700 may include additional actions before, after, and in between the enumerated actions. In some examples, one or more of the enumerated actions may be omitted or performed in a different order.

At block 755, a UE (e.g., the UE 202b) receives a DL calibration RS from a BS (e.g., the BS 204b). Further, the UE may receive a request for calibration that triggers the UE to engage in the calibration procedure.

At block 758, the method 750 includes determining, by the UE, a DL channel estimate based on the DL calibration RS received from the BS.

At block 760, the UE transmits an UL calibration RS to the BS in response to the DL calibration RS received by the UE.

At block 765, the UE transmits the DL channel estimate to the BS. The transmission may be done explicitly or implicitly as discussed above with respect to block 715.

At block 770, the UE receives one or more calibration parameters from the BS that the BS determined in response to the DL channel estimate transmitted to the BS at block 765. The UE may receive the one or more calibration parameters via, for example PDSCH.

At block 775, the method 750 includes implementing, by the UE, the one or more calibration parameters such that a difference between the UL channel estimate and the DL channel estimate as adjusted by the calibration parameters is minimized.

In some embodiments at block 755, the UE receives the DL calibration RS from a plurality of base stations. In response at block 760, the UE transmits a UL calibration RS to the plurality of base stations.

Figure 8:
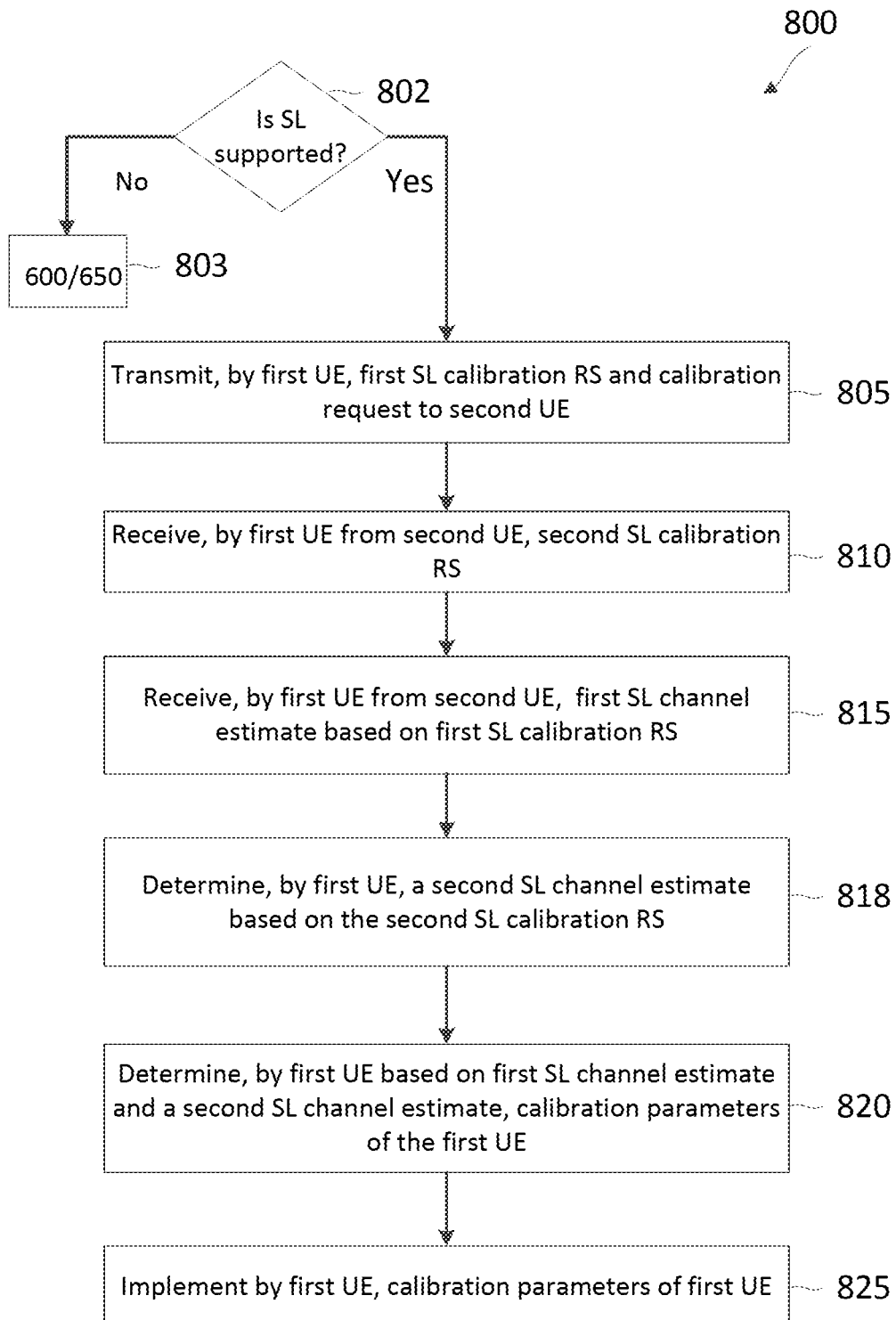
FIG. 8 is a flow diagram of a method of wireless communication according to embodiments of the present disclosure.

FIG. 8 is a flow diagram of a method 800 of wireless communication according to embodiments of the present disclosure. Aspects of the method 800 can be executed by a computing device (e.g., a processor, processing circuit, and/or other suitable component) of a wireless communication device, such as such as the UEs 102, 202, and 300. The method 800 may employ similar mechanisms as in the method 590. The method 800 can be better understood with reference to FIG. 2. As illustrated, the method 800 includes a number of enumerated actions, but examples of the method 800 may include additional actions before, after, and in between the enumerated actions. In some examples, one or more of the enumerated actions may be omitted or performed in a different order.

Beginning with decision block 802, if sidelink (SL) transmission between the UEs is not supported, then the method 800 proceeds to block 803.

At block 803, because SL is not supported, the methods of 600, 650, 700, and 750 depicted in FIGS. 6A, 6B, 7A, and 7B may be used instead where a BS is involved in the calibration process of a UE. Alternatively, the UEs available for calibration according to aspects of FIG. 8 may instead request one or more serving BSs to schedule a block of time for the respective UEs to engage in the calibration procedure between the UEs, with resources reserved by the one or more serving BSs so as to avoid collisions and related difficulties.

Returning to decision block 802, if SL is supported, then the method proceeds to block 805. At block 805 a first UE (e.g., the UE 202c) transmits a first SL calibration RS to a second UE (e.g., the UE 202d). Further, the UE 202c may transmit a request for calibration to the UE 202d to trigger the UE 202d to engage in the calibration procedure with the UE 202c.

At block 810, the first UE receives a second SL calibration RS from the second UE.

At block 815, the first UE receives a first SL channel estimate based on the first SL channel RS from the second UE. In some examples, the second UE determines the first SL channel estimate based on the transmitted first SL calibration RS. The second UE may, in some embodiments, transmit the first SL channel estimate to the first UE via explicit feedback, for example explicitly including the first SL channel estimate in a data payload on a PSSCH. In other embodiments, the second UE may implicitly signal the first SL channel estimate by modifying the amplitude and/or phase of the second SL calibration RS to take into account the first SL channel estimate.

At block 818, the first UE determines a second SL channel estimate based on the received second SL calibration RS from the second UE.

At block 820, the first UE determines calibration parameters of the first UE based on the first and second SL channel estimates. For example, where the first SL channel estimate was implicitly signaled, the first UE may further extract the first SL channel estimate by comparing the properties of the second SL calibration RS with that of a prior SL calibration RS received previously from the second UE.

At block 825, the first UE implements the one or more calibration parameters such that a difference between the first SL channel estimate and the second SL channel estimate as adjusted by the calibration parameters is minimized.

Figure 9:
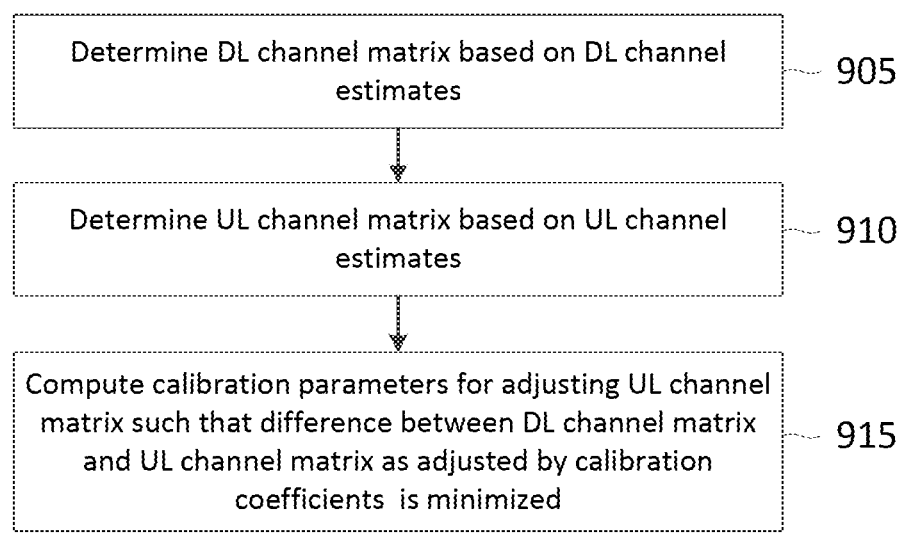
FIG. 9 is a flow diagram of a method of UL-DL reciprocity calibration coefficient computation according to embodiments of the present disclosure.

FIG. 9 is a flow diagram of a method 900 of UL-DL reciprocity calibration coefficient computation according to embodiments of the present disclosure. The aspects of method 900 are exemplary; other approaches may alternatively be used to calculate the calibration parameters of examples of the present disclosure. Aspects of the method 900 can be executed by a computing device (e.g., a processor, processing circuit, and/or other suitable component) of a wireless communication device, such as the BSs 104, 204 and 400, and UEs 102, 202, and 300. The method 900 can be better understood with reference to FIG. 2. The method 900 can be employed by the blocks 630, 720, and 820 of the methods 600, 700, and 800 to determine the UL-DL reciprocity calibration parameters. As illustrated, the method 900 includes a number of enumerated actions, but examples of the method 900 may include additional actions before, after, and in between the enumerated actions. In some examples, one or more of the enumerated actions may be omitted or performed in a different order.

At block 905, a DL channel matrix is determined based on DL channel estimates (either by a BS or a UE, according to the example). For example, the DL channel estimates correspond to the DL channel estimates determined by the UEs 202 and, in some examples, received by the BSs 204. The DL channel matrix can be expressed as shown below:

$$Y = \Phi_{UR} \times H_{DL} \times \Phi_{BT} + N_{DL}, \quad (1)$$

where Y represents the DL channel matrix including the received DL channel estimates, $\Phi_{UR}$ represents mismatches due to the RF receiver chains of the selected UEs, $H_{DL}$ represents the DL channels (e.g., the physical over-the-air channels) from the cooperative BSs to corresponding selected UEs, $\Phi_{BT}$ represents mismatches due to the RF transmitter chain of the cooperative BSs or the cooperative TPs, and $N_{DL}$ represents noise in the DL channels.

At block 910, the method 900 includes determining a UL channel matrix based on UL channel estimates. For example, the UL channel estimates correspond to the UL channel estimates computed by the BSs. The UL channel matrix can be expressed as shown below:

$$Z = \Phi_{BR} \times H_{UL} \times \Phi_{UT} N_{UL}. \quad (2)$$

where Z represents the UL channel matrix including the received UL channel estimates, $\Phi_{BR}$ represents mismatches due to the RF received chains of the cooperative BSs, $H_{UL}$ represents the UL channels (e.g., the physical over-the-air channels) from the selected UEs to corresponding BSs 204, $\Phi_{UT}$ represents mismatches due to the RF transmitter chains of the selected UEs, and $N_{UL}$ represents noise in the UL channels.

At block 915, the method 900 includes computing calibration coefficients for adjusting the UL channel matrix such that a difference between the DL channel matrix and the UL channel matrix as adjusted by the calibration coefficients is minimized. For example, equations (1) and (2) can be combined and expressed as shown below:

$$\text{diag}(\alpha) \times Z^T \times \text{diag}(\beta) = Y, \quad (3)$$

where $\text{diag}(\alpha) = \Phi_{UR} \times \Phi_{UR}^{-1}$, the superscript T represents a matrix transpose, and $\text{diag}(\beta) = \Phi_{BT} \times \Phi_{BR}^{-1}$. Thus, the calibration can compute the vectors $\alpha$ and $\beta$ and uses the vectors $\alpha$ and $\beta$ as the calibration coefficients for adjusting subsequent UL channel estimates obtained from SRSs during normal operation.

In one embodiment, the method 900 computes the calibration coefficients by performing eigenvector decomposition. For example, a least-square cost function can be defined as follows:

$$Y(b) = \text{vec}(\text{diag}(\alpha) \times Z^T \times \text{diag}(\beta) - Y)^H \times \text{vec}(\text{diag}(\alpha) \times Z^T \times \text{diag}(\beta) - Y), \quad (4)$$

where Y(b) represents the cost function, vec is a m×n vector converted from a m×n matrix, the superscript H represents a Hermitian matrix transpose, and $b = [\beta^T, \alpha^T]^T$. The term $\text{diag}(\alpha) \times Z^T \times \text{diag}(\beta)$ represents the calibration adjusted UL channel matrix.

The cost function shown in equation (4) can be minimized by determining a unit-norm eigenvector of the following matrix W:

$$W = \begin{bmatrix} A_{M \times M} & C_{M \times J} \\ D_{J \times M} & B_{J \times J} \end{bmatrix}, \quad (5)$$

where $A = \text{diag}(Z \times Z^H)$, $B = \text{diag}(Y^H \times Y)$, $C = -Y^T \times Z^H$, and $D = -Z^T \times Y^H$.

In another embodiment, the method 900 computes the calibration coefficients by performing maximal ratio combining (MRC). For example, the MRC begins with initializing the vectors α and β to all values of ones and updating α and β in a number of iterations. Each iteration updates α and β as shown below:

$$A = \text{diag}(\alpha) \times Z^T, \quad (6)$$
$$\beta = \frac{\text{diag}(A \times Y)}{\text{diag}(A \times A)},$$
$$B = \text{diag}(\beta) \times Z,$$
$$\alpha = \frac{\text{diag}(B \times Y^T)}{\text{diag}(B \times B)}.$$

The updating of α and β can be terminated when the desired SINRs are achieved at the selected UEs. The above approach may apply to either a BS or a UE, depending upon embodiment.

In some networks (e.g., new radio (NR) or 5G networks), devices may communicate by transmitting signals in different locations of a slot, e.g., in different locations of a DL centric slot and/or a UL centric slot. A DL centric slot may be used for transmitting DL data from the base station to one or more UEs, and an UL centric slot may be used for transmitting UL data from one or more UEs to a base station. An UL-centric slot is a slot with a majority of the OFDM symbols used for UL transmission. It typically has few DL symbols at the beginning (e.g. 2 symbols), then a guard duration, then UL symbols. A DL-centric slot is a slot with a majority of OFDM symbols used for DL transmission. It typically has most of the first symbols on DL (e.g. 12 symbols), then a guard interval, then a few UL symbols (e.g., 1-2 symbols).

Figure 10:
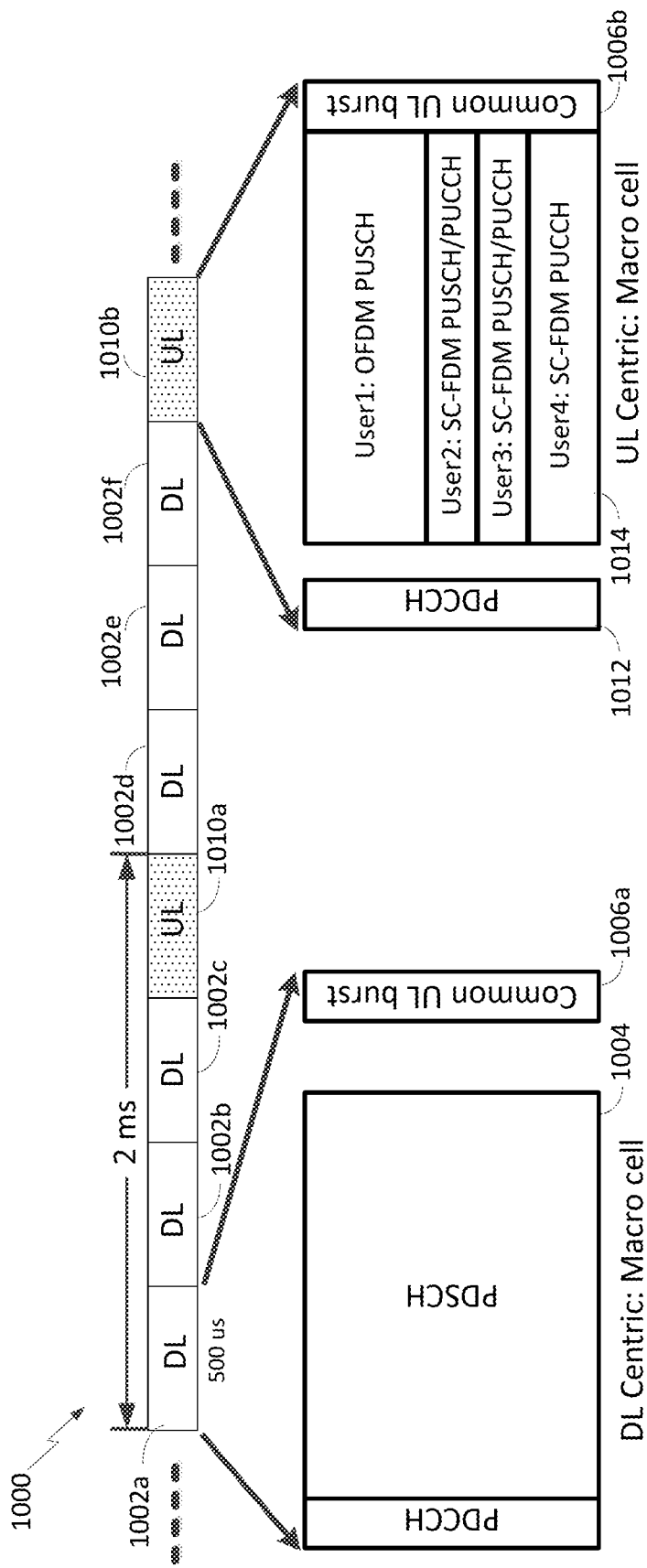
FIG. 10 is a timing diagram illustrating a wireless communication scheme including DL centric slots and UL centric slots.

FIG. 10 shows an exemplary transmission timeline 1000 that may be used in a TDD system in which one or more aspects of the present disclosure may be practiced. The timeline includes a plurality DL-centric slots 1002 (e.g., subframes) that have most DL symbols 1004 dedicated to DL transmissions (e.g., from a BS to a UE) and a common UL burst 1006 at the end with very limited resources dedicated to UL transmissions (e.g., from a UE to a BS). The timeline also includes a plurality of UL-centric slots 1010 (e.g., subframes) that each have a DL symbol 1012 at the beginning of the slot, but the remaining symbols 1014 of the slot are dedicated to UL transmissions. As seen in the UL slot 1010b, the UL symbols 1014 may be allocated to various users (e.g., UEs) for a variety of UL transmissions (e.g., OFDM PUSCH, SC-FDM PUSCH, SC-FDM PUCCH, OFDM PUCCH). Similarly, while not shown, the DL symbols 1004 of a DL-centric slot 1002 may be allocated for a variety of DL transmissions (e.g., PDCCH, PDSCH) to one or more UEs.

Figure 11A:
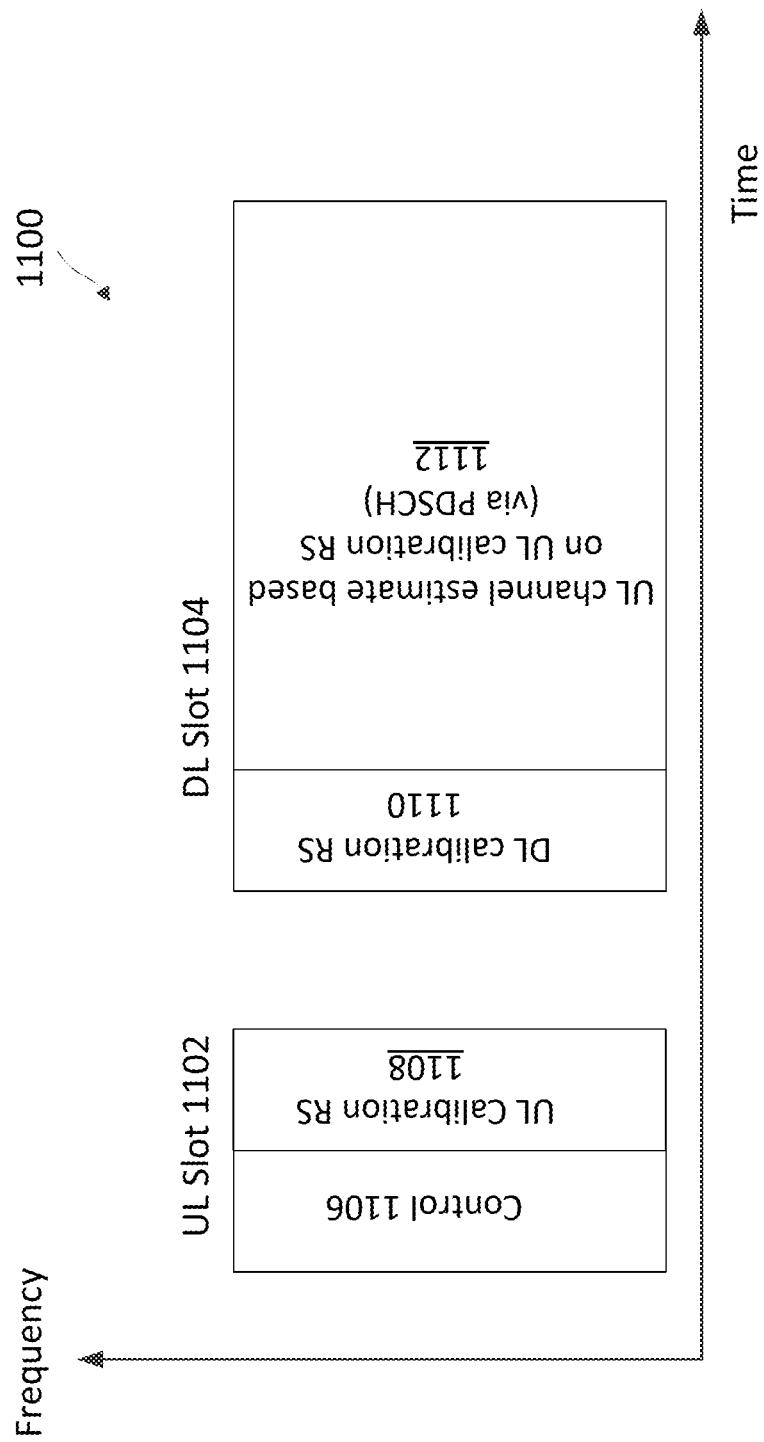
FIG. 11A illustrates a calibration frame structure for exchanging UL and DL calibration reference signals according to embodiments of the present disclosure.

FIG. 11A illustrates a calibration frame structure 1100 for exchanging UL and DL calibration RSs according to embodiments of the present disclosure. The calibration frame structure 1100 includes an UL slot 1102 and a DL slot 1104. The UL slot 1102 includes a control portion 1106. The control portion may carry a request for a calibration procedure from a UE 202 to a BS 204. The UL slot 1102 further includes an UL calibration RS portion 1108. The UL calibration RS portion 1108 may carry an UL calibration RS according to embodiments of the present disclosure from a UE 202 to a BS 204. In some embodiments, the UL calibration RS may be a form of SRS; in other embodiments, the UL calibration RS may be an RS sent in addition to a traditional SRS.

The DL slot 1104 includes a DL calibration RS portion 1110, and DL payload portion 1112. The DL calibration RS portion 1110 may carry a DL calibration RS, sent in response to the request included in the control portion 1106. In some embodiments, the DL calibration RS may be a form of CSI-RS; in other embodiments, the DL calibration RS may be an RS sent in addition to a traditional CSI-RS. The DL payload portion 1112 of the DL slot 1104 may carry an UL channel estimate that the BS 204 determined based on the received UL calibration RS in the UL calibration RS portion 1108 of UL slot 1102. The DL payload portion 1112 may be an explicit signaling of the UL channel estimate, e.g. via PDSCH. As discussed with respect to the various figures above, the UE 202 may, with the received DL calibration RS from portion 1110 of the DL slot 1104, generate a DL channel estimate. Further, with the explicitly signaled UL channel estimate from the DL payload portion 1112 and the DL channel estimate, the UE 202 may calibrate aspects of the UE.

Figure 11B:
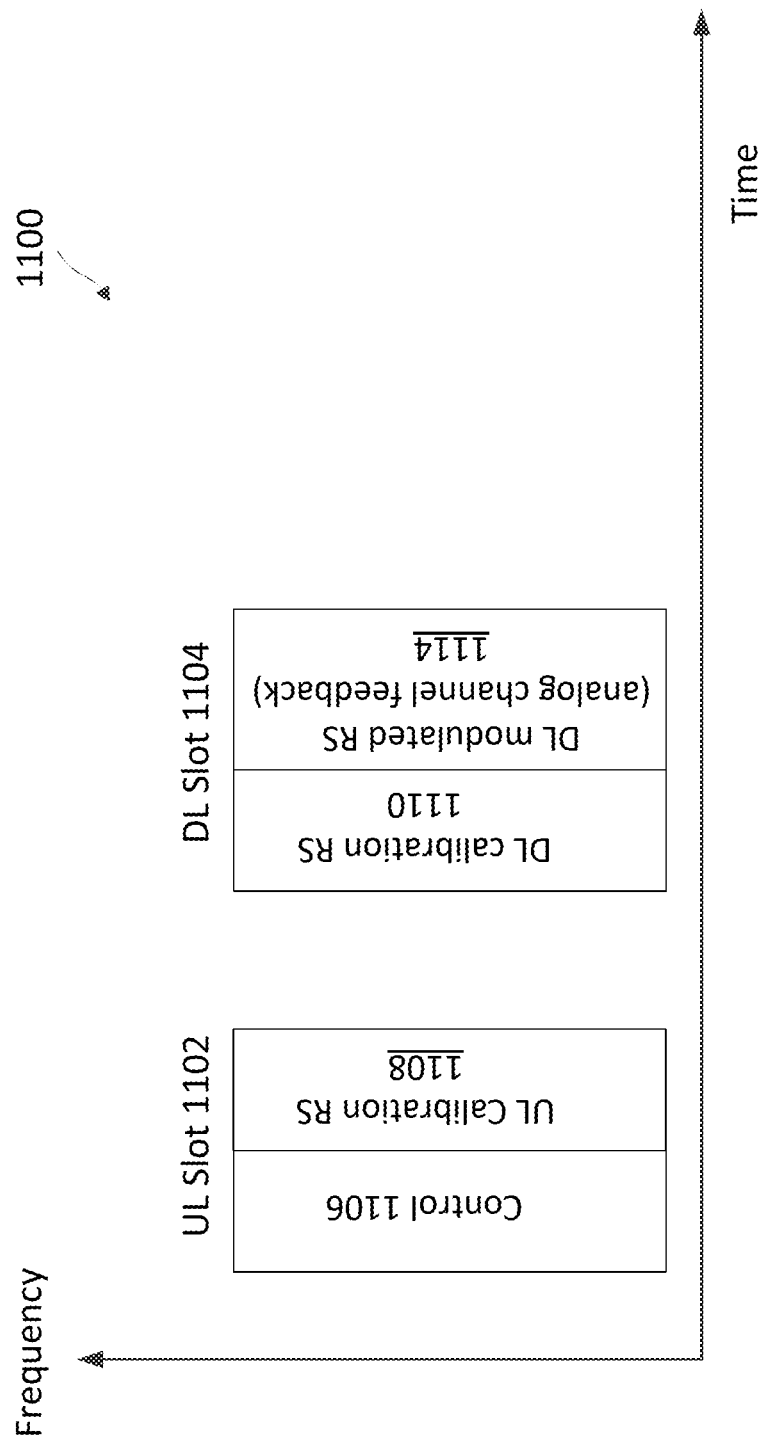
FIG. 11B illustrates a calibration frame structure for exchanging UL and DL calibration reference signals according to embodiments of the present disclosure.

FIG. 11B illustrates a calibration frame structure 1100 for exchanging UL and DL calibration RSs according to embodiments of the present disclosure. For simplicity of discussion, focus will be on the differences between FIGS. 11A and 11B. In FIG. 11B, instead of the BS 204 explicitly signaling the UL channel estimate via a DL payload portion 1112, the BS 204 may implicitly signal the UL channel estimate via a DL modulated RS portion 1114. The BS 204 may modify amplitude and/or phase of a subsequent DL calibration RS, e.g. the DL calibration RS portion 1110 or another DL calibration RS following the DL calibration RS portion 1110 (e.g., in succession in the DL slot 1104). The UE 202 receiving the regular DL calibration RS portion 1110 and the modified DL modulated RS in the DL modulated RS portion 1114 may extract the UL channel estimate from the differences between the DL calibration RS and the DL modulated RS, or alternatively determine one or more calibration parameters of the UE from the modulated DL calibration RS without obtaining separate DL and UL channel estimates, and proceed as discussed above.

Figure 11C:
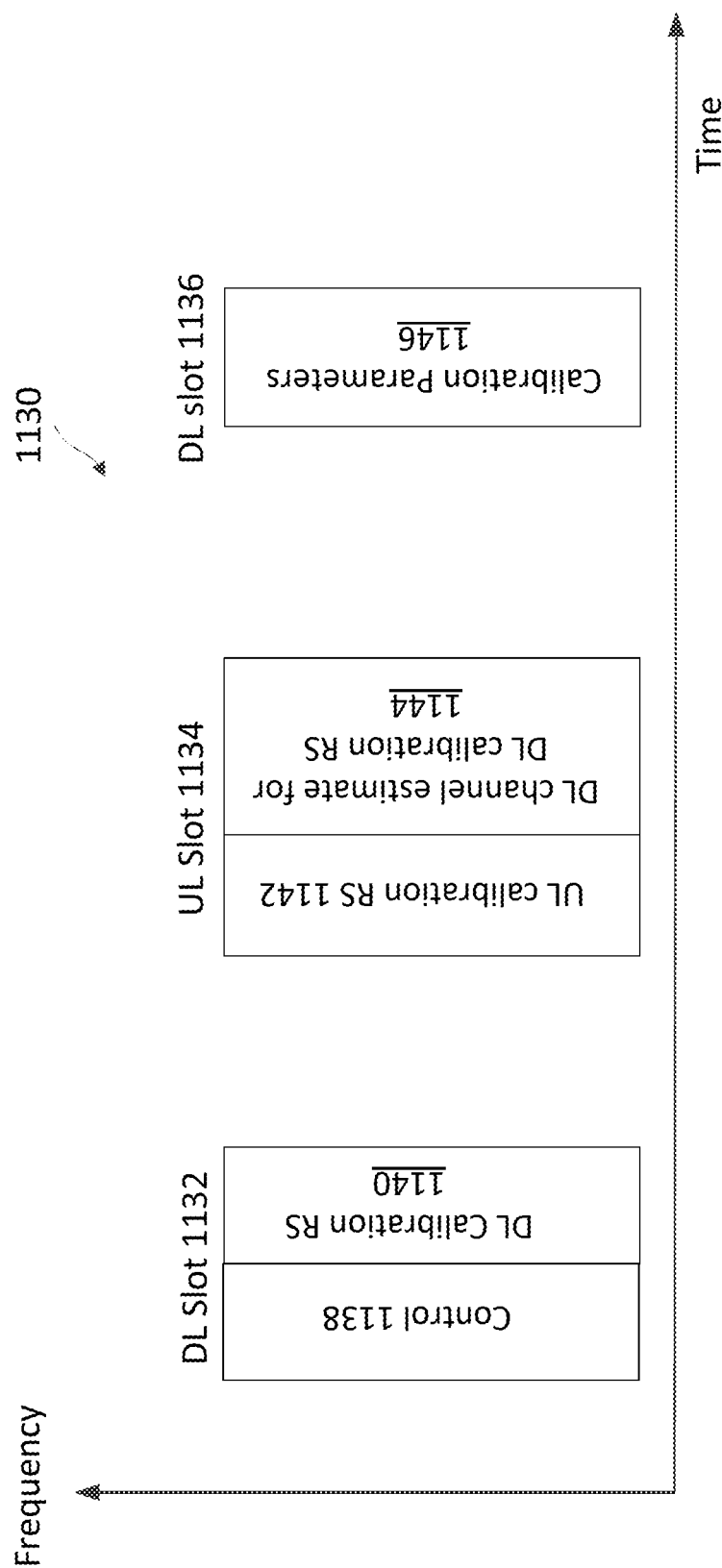
FIG. 11C illustrates a calibration frame structure for exchanging UL and DL calibration reference signals according to embodiments of the present disclosure.

FIG. 11C illustrates a calibration frame structure 1130 for exchanging UL and DL calibration RSs according to embodiments of the present disclosure. The calibration frame structure 1130 includes a DL slot 1132, an UL slot 1134, and a DL slot 1136.

The DL slot 1132 includes a control portion 1138. The control portion 1138 may carry a request for a calibration procedure from the a BS 204 to a UE 202. The DL slot 1132 further includes a DL calibration RS portion 1140. The DL calibration RS portion 1140 may carry a DL calibration RS according to embodiments of the present disclosure from a BS 204 to a UE 202.

The UE 202, upon receiving the request in the control portion 1138 and the DL calibration RS in the DL calibration RS portion 1140, may determine a DL channel estimate. The UL slot 1134 includes an UL calibration RS 1142 that the UE 202 provides in response to the request in control portion 1138. The UL slot 1134 further includes an UL payload portion 1144. The UL payload portion 1144 of the UL slot 1134 may carry a DL channel estimate that the UE 202 determined based on the received DL calibration RS in the DL calibration RS portion 1140 of DL slot 1132. The UL payload portion 1144 may be an explicit signaling of the DL channel estimate, e.g. via PUSCH.

Alternatively, instead of the UE 202 explicitly signaling the DL channel estimate via the UL payload portion 1144, the UE 202 may implicitly signal the DL channel estimate via the UL payload portion 1144. The UE 202 may modify amplitude and/or phase of a subsequent UL calibration RS, e.g. the UL calibration RS 1142 or another UL calibration RS in the UL payload portion 1144 following the UL calibration RS 1142 (e.g., in succession in the UL slot 1134). The BS 204 receiving the regular UL calibration RS 1142 and the modified UL modulated RS in the UL payload portion 1144 may extract the DL channel estimate from the differences between the UL calibration RS and the UL modulated RS, and proceed as discussed above.

Under either approach, the BS 204 may, with the received UL calibration RS from portion 1142 of the UL slot 1134, generate an UL channel estimate. Further, with the explicitly or implicitly signaled DL channel estimate from the UL payload portion 1144 and the DL channel estimate, the BS 204 may generate calibration parameters for both the BS 204 and the UE 202.

With calibration parameters for the UE 202 determined at the BS 204, another slot, DL slot 1136, may be used to signal the UE calibration parameters to the UE 202 via calibration signaling portion 1146. The calibration signaling portion 1146 may be, for example, made via PDSCH.

Figure 11D:
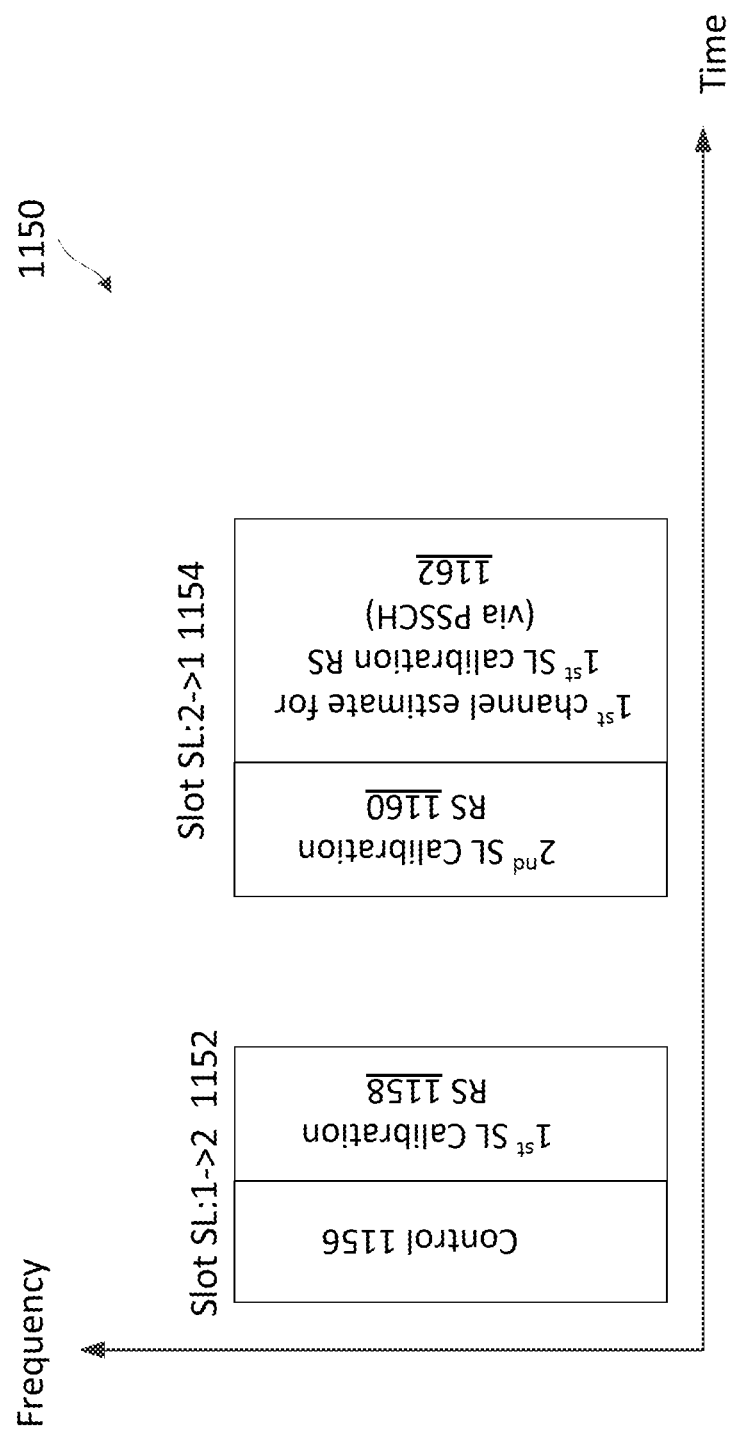
FIG. 11D illustrates a calibration frame structure for exchanging sidelink (SL) calibration reference signals according to embodiments of the present disclosure.

FIG. 11D illustrates a calibration frame structure 1150 for exchanging multiple sidelink (SL) according to embodiments of the present disclosure. The calibration frame structure 1150 includes first SL slot 1152 (from UE 1 to UE 2) and a second SL slot 1154 (from UE 2 to UE 1). This describes, for example, communication between two UEs 202 via sidelinks in D2D communications.

The first SL slot 1152 includes a control portion 1156. The control portion may carry a request for a calibration procedure from a first UE 202 (UE 1) to a second UE 202 (UE 2). The first SL slot 1152 further includes a first SL calibration RS portion 1158. The first SL calibration RS portion 1158 may carry a first SL calibration RS according to embodiments of the present disclosure from UE 1 to UE 2.

The second SL slot 1154 includes a second SL calibration RS portion 1160 and SL payload portion 1162. The second SL calibration RS portion 1160 may carry a second SL calibration RS, sent in response to the request included in the control portion 1156. The SL payload portion 1162 of the second SL slot 1154 may carry a first SL channel estimate that the UE 2 determined based on the received first SL calibration RS in the first SL calibration RS portion 1158 of first SL slot 1152. The SL payload portion 1162 may be an explicit signaling of the first SL channel estimate, e.g. via PSSCH.

Alternatively, instead of the UE 2 explicitly signaling the first SL channel estimate via the SL payload portion 1162, the UE 2 may implicitly signal the first SL channel estimate via the SL payload portion 1162. The UE 2 may modify amplitude and/or phase of a third SL calibration RS, e.g. following the second SL calibration RS 1160. The UE 1 receiving the second SL calibration RS 1160 and the modified third SL modulated RS in the SL payload portion 1162 may extract the first SL channel estimate from the differences between the second SL calibration RS and the third SL calibration RS.

As discussed with respect to the various figures above, the UE 1 may, with the received second SL calibration RS from portion 1160 of the second SL slot 1154, generate a second SL channel estimate (that from UE 2 to UE 1). Further, with the explicitly or implicitly signaled first SL channel estimate from the UE 2, the UE 1 may calibrate aspects of the UE 1 based on comparisons between the first and second channel estimates. Further, the UE 1 may signal calibration parameters to the UE 2.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a method of wireless communication, comprising transmitting, by a base station, a downlink (DL) calibration reference signal (RS) and a calibration request to a user equipment (UE). The method further comprises receiving, by the base station from the UE in response to the calibration request, an uplink (UL) calibration RS and a DL channel estimate of a DL channel associated with the base station and the UE. The method further comprises determining, by the base station based on the DL channel estimate and an UL channel estimate, a first one or more calibration parameters for the base station and a second one or more calibration parameters for the UE. The method further comprises transmitting, from the base station to the UE, the second one or more calibration parameters for calibration of the UE.

The method further includes receiving, by the base station, a scheduling request for calibration from the UE. The method further includes transmitting, by the base station, an identification of scheduled resources for calibration to the UE. The method further includes determining, by the base station, the UL channel estimate of the UL channel associated with the UE and the base station.

Embodiments of the present disclosure further include a method of wireless communication, comprising receiving, by a user equipment (UE) from a base station, a downlink (DL) calibration reference signal (RS) and a calibration request. The method further comprises determining, by the UE, a DL channel estimate of a DL channel associated with the base station and the UE. The method further comprises transmitting, by the UE to the base station in response to the calibration request, an uplink (UL) calibration RS and the DL channel estimate for use by the base station to determine one or more calibration parameters for the UE. The method further comprises receiving, by the UE from the base station, the one or more calibration parameters for calibration at the UE.

The method further includes transmitting, by the UE, a scheduling request for calibration to the base station. The method further includes receiving, by the UE, an identification of scheduled resources for calibration from the base station. The method further includes determining, by the UE, a DL channel estimate of the DL channel associated with the UE and the base station. The method further includes implementing, by the UE, the one or more calibration parameters that minimizes a difference between the UL channel estimate and the DL channel estimate as adjusted by the calibration parameters. The method further includes wherein the scheduling request is transmitted with predefined intervals. The method further includes wherein a predefined interval is at least one hour. The method further includes wherein the receiving the DL calibration RS further comprises receiving, by the UE, a DL calibration RS and a calibration request from a plurality of base stations, the transmitting further comprises transmitting, by the UE, the DL calibration RS and the DL channel estimate corresponding to each base station to the plurality of base stations, and the receiving the one or more calibration parameters further comprises receiving, by the UE, one or more calibration parameters from each one the plurality of base stations.

Embodiments of the present disclosure further include a method of wireless communication, comprising transmitting, by a first user equipment (UE), a first sidelink (SL) calibration reference signal (RS) and a calibration request to a second UE. The method further comprises receiving, by the first UE from the second UE in response to the calibration request, a second SL calibration RS and a first SL channel estimate of a first SL channel from the first UE to the second UE. The method further comprises determining, by the first UE, one or more calibration parameters of the first UE based on the first SL channel estimate and a second SL channel estimate of a second SL channel from the second UE to the first UE.

The method further includes transmitting, by the first UE, a scheduling request for calibration to the second UE. The method further includes receiving, by the first UE, a scheduling request for calibration from the second UE. The method further includes determining, by the first UE, the second SL channel estimate of the second SL channel. The method further includes comparing, by the first UE, the first and second SL channel estimates, and determining, by the first UE, the one or more calibration parameters of the first UE based on a difference between the first and second SL channel estimates. The method further includes determining, by the first UE, the one or more calibration parameters for adjusting the second SL channel estimates that minimizes a difference between the first and second SL channel estimates as adjusted by the calibration parameters. The method further includes receiving the first SL channel estimate by the first UE from the second UE via a physical sidelink shared channel (PSSCH). The method further includes wherein the second SL calibration RS has been modified based on the first SL channel estimate, the method further comprising performing calibration by the first UE. The method further includes wherein the scheduling request is transmitted with predefined intervals.

Embodiments of the present disclosure further include an apparatus, comprising a transmitter configured to transmit a downlink (DL) calibration reference signal (RS) and a calibration request to a user equipment (UE). The apparatus further comprises a receiver configured to receive, from the UE in response to the calibration request, an uplink (UL) calibration RS and a DL channel estimate of a DL channel associated with the apparatus and the UE. The apparatus further comprises a processor configured to determine, based on the DL channel estimate and an UL channel estimate, a first one or more calibration parameters for the apparatus and a second one or more calibration parameters for the UE. The apparatus further comprises wherein the transmitter is further configured to transmit, to the UE, the second one or more calibration parameters for calibration of the UE.

The apparatus further includes wherein the receiver is further configured to receive a scheduling request for calibration from the UE. The apparatus further includes wherein the transmitter further configured to transmit an identification of scheduled resources for calibration to the UE. The apparatus further includes wherein the processor is further configured to determine the UL channel estimate of the UL channel associated with the UE and the base station.

Embodiments of the present disclosure further include an apparatus, comprising a receiver configured to receive, from a base station, a downlink (DL) calibration reference signal (RS) and a calibration request. The apparatus further comprises a processor configured to determine a DL channel estimate of a DL channel associated with the base station and the apparatus. The apparatus further comprises a transmitter configured to transmit, to the base station in response to the calibration request, an uplink (UL) calibration RS and the DL channel estimate for use by the base station to determine one or more calibration parameters for the apparatus. The apparatus further comprises wherein the receiver is further configured to receive, from the base station, the one or more calibration parameters for calibration at the apparatus.

The apparatus further includes wherein the transmitter further configured to transmit a scheduling request for calibration to the base station. The apparatus further includes wherein the receiver is further configured to receive an identification of scheduled resources for calibration from the base station. The apparatus further includes wherein the processor is further configured determine a DL channel estimate of the DL channel associated with the apparatus and the base station. The apparatus further includes wherein the processor is further configured to implement the one or more calibration parameters that minimizes a difference between the UL channel estimate and the DL channel estimate as adjusted by the calibration parameters. The apparatus further includes wherein the scheduling request is transmitted with predefined intervals. The apparatus further includes wherein a predefined interval is at least one hour. The apparatus further includes wherein the receiver is further configured to receive a DL calibration RS and a calibration request from a plurality of base stations, the transmitter further configured to transmit the DL calibration RS and the DL channel estimate corresponding to each base station to the plurality of base stations, and the receiver is further configured to receive one or more calibration parameters from the each one the plurality of base stations.

Embodiments of the present disclosure further include an apparatus, comprising a transmitter configured to transmit a first sidelink (SL) calibration reference signal (RS) and a calibration request to a user equipment (UE). The apparatus further comprises a receiver configured to receive from the UE, in response to the calibration request, a second SL calibration RS and a first SL channel estimate of a first SL channel from the apparatus to the UE. The apparatus further comprises a processor configured to determine one or more calibration parameters of the apparatus based on the first SL channel estimate and a second SL channel estimate of a second SL channel from the UE to the apparatus.

The apparatus further includes wherein the transmitter is further configured to transmit a scheduling request for calibration to the UE. The apparatus further includes wherein the receiver is further configured to receive a scheduling request for calibration from the UE. The apparatus further includes wherein the processor is further configured to determine the second SL channel estimate of the second SL channel. The apparatus further includes wherein the processor is configured to compare the first and second SL channel estimates, and determine the one or more calibration parameters of the apparatus based on a difference between the first and second SL channel estimates. The apparatus further includes wherein the processor is configured to determine the one or more calibration parameters for adjusting the second SL channel estimate that minimizes a difference between the first and second SL channel estimates as adjusted by the calibration parameters. The apparatus further includes wherein the receiver is further configured to receive the first SL channel estimate from the UE via a physical sidelink shared channel (PSSCH). The apparatus further includes wherein the receiver is further configured to receive, from the UE, a second SL calibration RS that has been modified based on the first SL channel estimate, and the processor is further configured to perform calibration. The apparatus further includes wherein the scheduling request is transmitted with predefined intervals.

Embodiments of the present disclosure further include a computer-readable medium having program code recorded thereon, the program code comprising code for causing a user equipment (UE) to transmit an uplink (UL) calibration reference signal (RS) and a calibration request to a base station. The program code further comprises code for causing the UE to receive, from the base station in response to the calibration request, a downlink (DL) calibration RS and an UL channel estimate of an UL channel associated with the UE and the base station. The program code further comprises code for causing the UE to calibrate one or more parameters of the UE based on the UL channel estimate and a DL channel estimate based on the DL calibration RS.

The computer-readable medium further includes code for causing the UE to transmit a scheduling request for calibration to the base station. The computer-readable medium further includes code for causing the UE to receive an identification of scheduled resources for calibration from the base station. The computer-readable medium further includes code for causing the UE to determine the DL channel estimate of the DL channel associated with the UE and the base station. The computer-readable medium further includes code for causing the UE to compare the DL and the UL channel estimates, and calibrate the one or more parameters of the UE based on a difference between the DL and the UL channel estimates. The computer-readable medium further includes code for causing the UE to determine the one or more calibration parameters for adjusting the DL channel estimate that minimizes a difference between the DL channel estimate and the UL channel estimate as adjusted by the calibration parameters. The computer-readable medium further includes code for causing the UE to receive the UL channel estimate from the base station via a physical DL shared channel (PDSCH). The computer-readable medium further includes wherein the code for causing the UE to transmit further comprises code for causing the UE to transmit the UL calibration RS to a plurality of base stations, and the code for causing the UE to receive further comprises code for causing the UE to receive a DL calibration RS and a UL channel estimate from each one of the plurality of base stations. The computer-readable medium further includes code for causing the UE to receive from a base station, a modulated DL calibration RS that has been modulated based on the UL channel estimate, and calibrate one or more parameters of the UE based on the DL channel estimate modulated by the UL channel estimate.

Embodiments of the present disclosure further include a computer-readable medium having program code recorded thereon, the program code comprising code for causing a base station to receive an uplink (UL) calibration reference signal (RS) and a calibration request from a user equipment (UE). The program code further comprises code for causing the base station to determine an UL channel estimate of an UL channel associated with the UE and the base station. The program code further comprises code for causing the base station to transmit, to the UE in response to the calibration request, a downlink (DL) calibration RS and the UL channel estimate for use by the UE in calibrating one or more parameters of the UE.

The computer-readable medium further includes code for causing the base station to receive a scheduling request for calibration from the UE. The computer-readable medium further includes code for causing the base station to transmit an identification of scheduled resources for calibration to the UE. The computer-readable medium further includes code for causing the base station to transmit the UL channel estimate from the base station to the UE via explicit channel feedback. The computer-readable medium further includes wherein the code for causing the base station to transmit the UL channel estimate further comprises code for causing the base station to insert the UL channel estimate into a physical DL control channel (PDCCH) for transmission to the UE. The computer-readable medium further includes wherein the program code further comprises code for causing the base station to modify a next DL calibration RS based on the UL channel estimate, and transmit the modified next DL calibration RS to the UE for extraction of the UL channel estimate therefrom. The computer-readable medium further includes wherein the next DL calibration RS is a channel state information reference signal (CSIRS).

Embodiments of the present disclosure further include a computer-readable medium having program code recorded thereon, the program code comprises code for causing a base station to transmit a downlink (DL) calibration reference signal (RS) and a calibration request to a user equipment (UE). The program code further comprises code for causing the base station to receive, from the UE in response to the calibration request, an uplink (UL) calibration RS and a DL channel estimate of a DL channel associated with the base station and the UE. The program code further comprises code for causing the base station to determine, based on the DL channel estimate and an UL channel estimate, a first one or more calibration parameters for the base station and a second one or more calibration parameters for the UE. The program code further comprises code for causing the base station to transmit, to the UE, the second one or more calibration parameters for calibration of the UE.

The computer-readable medium further includes code for causing the base station to receive a scheduling request for calibration from the UE. The computer-readable medium further includes code for causing the base station to transmit an identification of scheduled resources for calibration to the UE. The computer-readable medium further includes code for causing the base station to determine the UL channel estimate of the UL channel associated with the UE and the base station.

Embodiments of the present disclosure further include a computer-readable medium having program code recorded thereon, the program code comprising code for causing a user equipment (UE) to receive, from a base station, a downlink (DL) calibration reference signal (RS) and a calibration request. The program code further comprises code for causing the UE to determine a DL channel estimate of a DL channel associated with the base station and the UE. The program code further comprises code for causing the UE to transmit, to the base station in response to the calibration request, an uplink (UL) calibration RS and the DL channel estimate for use by the base station to determine one or more calibration parameters for the UE. The program code further comprises code for causing the UE to receive, from the base station, the one or more calibration parameters for calibration at the UE.

The computer-readable medium further includes code for causing the UE to transmit a scheduling request for calibration to the base station. The computer-readable medium further includes code for causing the UE to receive an identification of scheduled resources for calibration from the base station. The computer-readable medium further includes code for causing the UE to determine a DL channel estimate of the DL channel associated with the UE and the base station. The computer-readable medium further includes code for causing the UE to implement the one or more calibration parameters that minimizes a difference between the UL channel estimate and the DL channel estimate as adjusted by the calibration parameters. The computer-readable medium further includes wherein the scheduling request is transmitted with predefined intervals. The computer-readable medium further includes wherein a predefined interval is at least one hour. The computer-readable medium further includes wherein the code for causing the UE to receive the DL calibration RS further comprises code for causing the UE to receive a DL calibration RS and a calibration request from a plurality of base stations, the code for causing the UE to receive to transmit further comprises code for causing the UE to transmit the DL calibration RS and the DL channel estimate corresponding to each base station to the plurality of base stations, and the code for causing the UE to receive the one or more calibration parameters further comprises code for causing the UE to receive one or more calibration parameters from each one the plurality of base stations.

Embodiments of the present disclosure further include a computer-readable medium having program code recorded thereon, the program code comprising code for causing a first user equipment (UE) to transmit a first sidelink (SL) calibration reference signal (RS) and a calibration request to a second UE. The program code further comprises code for causing the first UE to receive, from the second UE in response to the calibration request, a second SL calibration RS and a first SL channel estimate of a first SL channel from the first UE to the second UE. The program code further comprises code for causing the first UE to determine one or more calibration parameters of the first UE based on the first SL channel estimate and a second SL channel estimate of a second SL channel from the second UE to the first UE.

The computer-readable medium further includes code for causing the first UE to transmit a scheduling request for calibration to the second UE. The computer-readable medium further includes code for causing the first UE to receive a scheduling request for calibration from the second UE. The computer-readable medium further includes code for causing the first UE to determine the second SL channel estimate of the second SL channel. The computer-readable medium further includes code for causing the first UE to compare the first and second SL channel estimates, and determine the one or more calibration parameters of the first UE based on a difference between the first and second SL channel estimates. The computer-readable medium further includes code for causing the first UE to determine the one or more calibration parameters for adjusting the second SL channel estimates that minimizes a difference between the first and second SL channel estimates as adjusted by the calibration parameters. The computer-readable medium further includes code for causing the first UE to receive the first SL channel estimate from the second UE via a physical sidelink shared channel (PSSCH). The computer-readable medium further includes wherein the second SL calibration RS has been modified based on the first SL channel estimate, and wherein the program code further comprises code for causing the first UE to perform calibration. The computer-readable medium further includes wherein the scheduling request is transmitted with predefined intervals.

Embodiments of the present disclosure further include an apparatus comprising means for transmitting an uplink (UL) calibration reference signal (RS) and a calibration request to a base station. The apparatus further comprises means for receiving, from the base station in response to the calibration request, a downlink (DL) calibration RS and an UL channel estimate of an UL channel associated with the apparatus and the base station. The apparatus further comprises means for calibrating one or more parameters of the apparatus based on the UL channel estimate and a DL channel estimate based on the DL calibration RS.

The apparatus further includes means for transmitting a scheduling request for calibration to the base station. The apparatus further includes means for receiving an identification of scheduled resources for calibration from the base station. The apparatus further includes means for determining the DL channel estimate of the DL channel associated with the apparatus and the base station. The apparatus further includes wherein means for calibrating further comprises means for comparing the DL and the UL channel estimates, and means for calibrating the one or more parameters of the apparatus based on a difference between the DL and the UL channel estimates. The apparatus further includes means for determining the one or more calibration parameters for adjusting the DL channel estimate that minimizes a difference between the DL channel estimate and the UL channel estimate as adjusted by the calibration parameters. The apparatus further includes means for receiving the UL channel estimate from the base station via a physical DL shared channel (PDSCH). The apparatus further includes wherein means for transmitting further comprises means for transmitting the UL calibration RS to a plurality of base stations, and means for receiving further comprises means for receiving a DL calibration RS and a UL channel estimate from each one of the plurality of base stations. The apparatus further includes means for receiving, from a base station, a modulated DL calibration RS that has been modulated based on the UL channel estimate, and means for calibrating one or more parameters of the apparatus based on the DL channel estimate modulated by the UL channel estimate.

Embodiments of the present disclosure further include an apparatus comprising means for receiving an uplink (UL) calibration reference signal (RS) and a calibration request from a user equipment (UE). The apparatus further comprises means for determining an UL channel estimate of an UL channel associated with the UE and the apparatus. The apparatus further comprises means for transmitting, to the UE in response to the calibration request, a downlink (DL) calibration RS and the UL channel estimate for use by the UE in calibrating one or more parameters of the UE.

The apparatus further includes means for receiving a scheduling request for calibration from the UE. The apparatus further includes means for transmitting an identification of scheduled resources for calibration to the UE. The apparatus further includes means for transmitting the UL channel estimate to the UE via explicit channel feedback. The apparatus further includes wherein the means for transmitting the UL channel estimate further comprises means for inserting the UL channel estimate into a physical DL control channel (PDCCH) for transmission to the UE. The apparatus further includes means for modifying a next DL calibration RS based on the UL channel estimate, and means for transmitting the modified next DL calibration RS to the UE for extraction of the UL channel estimate therefrom. The apparatus further includes wherein the next DL calibration RS is a channel state information reference signal (CSIRS).

Embodiments of the present disclosure further include an apparatus comprising means for transmitting a downlink (DL) calibration reference signal (RS) and a calibration request to a user equipment (UE). The apparatus further comprises means for receiving, from the UE in response to the calibration request, an uplink (UL) calibration RS and a DL channel estimate of a DL channel associated with the apparatus and the UE. The apparatus further comprises means for determining, based on the DL channel estimate and an UL channel estimate, a first one or more calibration parameters for the apparatus and a second one or more calibration parameters for the UE. The apparatus further comprises means for transmitting, to the UE, the second one or more calibration parameters for calibration of the UE.

The apparatus further includes means for receiving a scheduling request for calibration from the UE. The apparatus further includes means for transmitting an identification of scheduled resources for calibration to the UE. The apparatus further includes means for determining the UL channel estimate of the UL channel associated with the UE and the apparatus.

Embodiments of the present disclosure further include an apparatus comprising means for receiving, from a base station, a downlink (DL) calibration reference signal (RS) and a calibration request. The apparatus further comprises means for determining a DL channel estimate of a DL channel associated with the base station and the apparatus. The apparatus further comprises means for transmitting, to the base station in response to the calibration request, an uplink (UL) calibration RS and the DL channel estimate for use by the base station to determine one or more calibration parameters for the apparatus. The apparatus further comprises means for receiving, from the base station, the one or more calibration parameters for calibration at the apparatus.

The apparatus further includes means for transmitting a scheduling request for calibration to the base station. The apparatus further includes means for receiving an identification of scheduled resources for calibration from the base station. The apparatus further includes means for determining a DL channel estimate of the DL channel associated with the apparatus and the base station. The apparatus further includes means for implementing the one or more calibration parameters that minimizes a difference between the UL channel estimate and the DL channel estimate as adjusted by the calibration parameters. The apparatus further includes wherein the scheduling request is transmitted with predefined intervals. The apparatus further includes wherein a predefined interval is at least one hour. The apparatus further includes wherein the means for receiving further comprises means for receiving a DL calibration RS and a calibration request from a plurality of base stations, the means for transmitting further comprises means for transmitting the UL calibration RS and the DL channel estimate corresponding to each base station to the plurality of base stations, and the means for receiving the one or more calibration parameters further comprises means for receiving one or more calibration parameters from each one the plurality of base stations.

Embodiments of the present disclosure include an apparatus comprising means for transmitting a first sidelink (SL) calibration reference signal (RS) and a calibration request to a user equipment (UE). The apparatus further comprises means for receiving from the UE in response to the calibration request, a second SL calibration RS and a first SL channel estimate of a first SL channel from the apparatus to the UE. The apparatus further comprises means for determining one or more calibration parameters of the apparatus based on the first SL channel estimate and a second SL channel estimate of a second SL channel from the UE to the apparatus.

The apparatus further includes means for transmitting a scheduling request for calibration to the UE. The apparatus further includes means for receiving a scheduling request for calibration from the UE. The apparatus further includes means for determining the second SL channel estimate of the second SL channel. The apparatus further includes means for comparing the first and second SL channel estimates, and means for determining the one or more calibration parameters of the apparatus based on a difference between the first and second SL channel estimates. The apparatus further includes means for determining the one or more calibration parameters for adjusting the second SL channel estimates that minimizes a difference between the first and second SL channel estimates as adjusted by the calibration parameters. The apparatus further includes means for receiving the first SL channel estimate from the UE via a physical sidelink shared channel (PSSCH). The apparatus further includes wherein the second SL calibration RS has been modified based on the first SL channel estimate, the apparatus further comprising means for performing the calibration. The apparatus further includes wherein the scheduling request is transmitted with predefined intervals.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
determining, by a user equipment (UE), a data transmission parameter of data received from a base station;
transmitting, by the UE, an uplink (UL) calibration reference signal (RS) and a calibration request to a plurality of base stations including the base station in response to the determining;
receiving, by the UE in response to the calibration request, a plurality of downlink (DL) calibration reference signals comprising a respective DL calibration RS from each one of the plurality of base stations and a plurality of UL channel estimates comprising a respective UL channel estimate from each one of the plurality of base stations; and
calibrating, by the UE, one or more parameters of the UE based on the plurality of UL channel estimates and a plurality of DL channel estimates determined from the plurality of DL calibration reference signals; and
applying, by the UE, the one or more calibrated parameters with each of the plurality of base stations.

2. The method of claim 1, further comprising:
transmitting, by the UE, a respective scheduling request for calibration to each of the plurality of base stations.

3. The method of claim 1, further comprising:
determining, by the UE, the plurality of DL channel estimates.

4. The method of claim 1, wherein the calibrating further comprises:
comparing, by the UE, the plurality of DL channel estimates and the plurality of UL channel estimates; and
calibrating, by the UE, the one or more parameters of the UE based on a difference between the plurality of DL channel estimates and the plurality of UL channel estimates.

5. The method of claim 1, further comprising:
determining, by the UE, values of the one or more parameters for adjusting the plurality of DL channel estimates that minimize a difference between the plurality of UL channel estimates and the plurality of DL channel estimates as adjusted by the one or more parameters.

6. The method of claim 1, further comprising:
receiving, by the UE, each of the plurality of UL channel estimates from the plurality of base stations via a corresponding plurality of physical DL shared channels (PDSCH).

7. The method of claim 1, wherein:
each of the DL calibration RS comprises a modulated DL calibration RS that has been modulated based on a corresponding UL channel estimate from the plurality of UL channel estimates,
each of the UL channel estimates is received via the corresponding modulated DL calibration RS, and
the calibrating further comprises calibrating, by the UE, the one or more parameters of the UE based on each of the modulated DL calibration RS.

8. The method of claim 1, wherein:
the one or more parameters of the UE comprises one or more radio frequency receiver chain parameters of the UE, and
the calibrating further comprises calibrating the one or more radio frequency receiver chain parameters and a respective radio frequency transmitter chain parameter of each of the plurality of base stations.

9. The method of claim 1, further comprising:
iterating, by the UE, a value for the one or more parameters until a target signal to noise ratio results from the applying the one or more calibrated parameters.

10. A method of wireless communication, comprising:
receiving, by a base station, an uplink (UL) calibration reference signal (RS) and a calibration request from a user equipment (UE) in response a determination of a data transmission parameter of data received from the base station at the UE;
determining, by the base station, an UL channel estimate of an UL channel associated with the UE and the base station based on the UL calibration RS;
transmitting, by the base station to the UE in response to the calibration request, a downlink (DL) calibration RS and the UL channel estimate; and
receiving, by the base station, a transmission transmitted by the UE using a transmit chain configured using one or more parameters calibrated based on a plurality of DL calibration reference signals and a plurality of UL channel estimates from a plurality of base stations including the UL channel estimate and the DL calibration RS from the base station.

11. The method of claim 10, further comprising:
receiving, by the base station, a scheduling request for calibration from the UE.

12. The method of claim 10, further comprising:
transmitting, by the base station, an identification of scheduled resources for calibration to the UE.

13. The method of claim 10, further comprising:
transmitting the UL channel estimate from the base station to the UE via explicit channel feedback.

14. The method of claim 13, wherein transmitting the UL channel estimate comprises:
inserting the UL channel estimate into a physical DL control channel (PDCCH) for transmission to the UE.

15. The method of claim 10, further comprising:
modifying, by the base station, the DL calibration RS based on the UL channel estimate prior to the transmitting, wherein the transmitting the DL calibration RS comprises transmitting the modified DL calibration RS for extraction of the UL channel estimate therefrom.

16. The method of claim 15, wherein the modified DL calibration RS is a channel state information reference signal (CSIRS).

17. An apparatus comprising:
a processor configured to determine a data transmission parameter of data received from a base station;
a transmitter configured to transmit an uplink (UL) calibration reference signal (RS) and a calibration request to a plurality of base stations including the base station in response to the determination; and
a receiver configured to receive, in response to the calibration request, a plurality of downlink (DL) calibration reference signals comprising a respective DL calibration RS from each one of the plurality of base stations and a plurality of UL channel estimates comprising a respective UL channel estimate from each one of the plurality of base stations,
wherein the processor is further configured to calibrate one or more parameters of the apparatus based on the plurality of UL channel estimates and a plurality of DL channel estimates determined from the plurality of DL calibration reference signals, and apply the one or more calibrated parameters with each of the plurality of base stations.

18. The apparatus of claim 17, wherein the transmitter is further configured to transmit a respective scheduling request for calibration to each of the plurality of base stations.

19. The apparatus of claim 17, wherein the processor is further configured to determine the plurality of DL channel estimates.

20. The apparatus of claim 17, wherein the processor is configured to:
compare the plurality of DL channel estimates and the plurality of UL channel estimates; and
calibrate the one or more parameters of the apparatus based on a difference between the plurality of DL channel estimates and the plurality of UL channel estimates.

21. The apparatus of claim 17, wherein the processor is further configured to:
determine values of the one or more parameters for adjusting the plurality of DL channel estimates that minimize a difference between the plurality of UL channel estimates and the plurality of DL channel estimates as adjusted by the one or more parameters.

22. The apparatus of claim 17, wherein the receiver is further configured to receive each of the plurality of UL channel estimates from the plurality of base stations via a corresponding physical DL shared channels (PDSCH).

23. The apparatus of claim 17, wherein:
each of the DL calibration RS comprises a modulated DL calibration RS that has been modulated based on a corresponding UL channel estimate from the plurality of UL channel estimates,
each of the UL channel estimates is received via the corresponding modulated DL calibration RS, and
the processor is further configured to calibrate the one or more parameters of the apparatus based on each of the modulated DL calibration RS.

24. An apparatus, comprising:
a receiver configured to receive an uplink (UL) calibration reference signal (RS) and a calibration request from a user equipment (UE) in response to a determination of a data transmission parameter of data received from the apparatus at the UE;
a processor configured to determine an UL channel estimate of an UL channel associated with the UE and the apparatus based on the UL calibration RS; and
a transmitter configured to transmit to the UE, in response to the calibration request, a downlink (DL) calibration RS and the UL channel estimate,
wherein the receiver is further configured to receive a transmission transmitted by the UE using a transmit chain configured using one or more parameters calibrated based on a plurality of DL calibration reference signals and a plurality of UL channel estimates from a plurality of base stations including the UL channel estimate and the DL calibration RS from the apparatus.

25. The apparatus of claim 24, wherein the receiver is further configured to receive a scheduling request for calibration from the UE.

26. The apparatus of claim 24, wherein the transmitter is further configured to transmit an identification of scheduled resources for calibration to the UE.

27. The apparatus of claim 24, wherein the transmitter is further configured to transmit the UL channel estimate to the UE via explicit channel feedback.

28. The apparatus of claim 27, wherein the transmitter is further configured to insert the UL channel estimate into a physical DL control channel (PDCCH) for transmission to the UE.

29. The apparatus of claim 24, wherein:
the processor is further configured to modify the DL calibration RS based on the UL channel estimate prior to the transmission; and
the transmitter is further configured to transmit the modified DL calibration RS as the DL calibration RS to the UE for extraction of the UL channel estimate therefrom.

30. The apparatus of claim 29, wherein the modified DL calibration RS is a channel state information reference signal (CSIRS).

* * * * *